US011366437B2

(12) United States Patent
Mahapatra

(10) Patent No.: US 11,366,437 B2
(45) Date of Patent: Jun. 21, 2022

(54) SYSTEM AND METHOD FOR OPTIMAL FOOD COOKING OR HEATING OPERATIONS

(71) Applicant: Samarth Mahapatra, Marietta, GA (US)

(72) Inventor: Samarth Mahapatra, Marietta, GA (US)

( * ) Notice: Subject to any disclaimer, the term of this patent is extended or adjusted under 35 U.S.C. 154(b) by 615 days.

(21) Appl. No.: 16/415,878

(22) Filed: May 17, 2019

(65) Prior Publication Data

US 2020/0363778 A1   Nov. 19, 2020

(51) Int. Cl.
*G05B 15/02* (2006.01)
*H05B 6/64* (2006.01)

(52) U.S. Cl.
CPC .......... *G05B 15/02* (2013.01); *H05B 6/6464* (2013.01)

(58) Field of Classification Search
CPC .. G05B 15/02; G05B 13/0265; H05B 6/6464; A47J 36/32
See application file for complete search history.

(56) References Cited

U.S. PATENT DOCUMENTS

| | | | |
|---|---|---|---|
| 8,816,828 B2 | 8/2014 | Ebrom et al. | |
| 8,998,662 B2* | 4/2015 | Deckard | F16C 33/7886 384/477 |
| 10,213,046 B2* | 2/2019 | Nonaka | A47J 36/321 |
| 10,520,199 B2* | 12/2019 | Polster | A47J 37/0641 |
| 10,530,866 B2* | 1/2020 | Boyce | G06F 16/9535 |
| 10,540,864 B2* | 1/2020 | Sloo | G08B 17/10 |
| 11,231,329 B2* | 1/2022 | Kyaw | G01K 1/024 |
| 2012/0132635 A1 | 5/2012 | Mishra | |
| 2014/0234496 A1* | 8/2014 | Siegel | F23N 1/022 431/12 |
| 2016/0218884 A1* | 7/2016 | Ebrom | H04L 12/2814 |
| 2016/0372005 A1* | 12/2016 | Bajpai | G09B 19/0092 |
| 2017/0074522 A1 | 3/2017 | Cheng | |
| 2019/0291277 A1* | 9/2019 | Oleynik | B25J 9/162 |
| 2020/0363778 A1* | 11/2020 | Mahapatra | G05B 15/02 |

* cited by examiner

*Primary Examiner* — Ramesh B Patel
(74) *Attorney, Agent, or Firm* — Ariel S. Bentolila; Bay Area IP Group, LLC

(57) ABSTRACT

A system and method for optimal cooking operations and pre-hazard monitoring using continuous and adaptive machine learning enabling user specific and customizable optimizable, specific, and customizable cooking operations, and identification of pre-hazardous and user specific non-optimal conditions that may arise during cooking operations.

20 Claims, 16 Drawing Sheets

1100

◀ Chef in a Restaurant
Recipe: Beef Steak

In this scenario the cook can receive assistance from the system and method to cook optimally per customer's preference and especially while cooking for several customers.

1300

◀ Senior Citizen
Recipe: Grilled Cheese Sandwich

1400

◀ New Cook(Kid or Teen)
Recipe: Chicken Patties

SYSTEM AND METHOD FOR OPTIMAL FOOD COOKING OR HEATING OPERATIONS

CROSS-REFERENCE TO RELATED APPLICATIONS

Not applicable.

RELATED CO-PENDING U.S. PATENT APPLICATIONS

Not applicable.

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to a system and method for optimal cooking operations and pre-hazard monitoring. More particularly, certain embodiments of the invention relate to a system and method for optimal cooking operations and pre-hazard monitoring using continuous and adaptive machine learning enabling user specific and customizable optimizable, specific, and customizable cooking operations, and identification of pre-hazardous and user specific non-optimal conditions that may arise during cooking operations.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. It may be appreciated by a person with ordinary skill in the art that a variety of intelligent systems and methods for cooking are described in the art quite a few of which are currently available in the market. The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that one system available in the art may include a cooking range that may include a set of apparatus that combine and analyze electronic signals from Hall Effect sensors, current transformer, pyroelectric infrared sensor, ionization chamber smoke sensor, to determine the imminence of fire hazard. On determination of the imminence of fire the system may switch-OFF the power source to the cooking range after pausing and sounding an alarm long enough to allow a user to intervene. The various electronic circuitries are provided with stored charge powers back up to retain memory during power failures. The cooking range may include a timer mode cooking feature that may automate cooking and save power. However, the cooking range may not be designed to interfere with cooking if the situation is safe or the cooking is attended to by a user. One other system in the prior art may provide a recipe wand which reads meal plans and recipes for a recipe book, and with data about the appliance and one or more cycles of operation, sends data about a consumable to the appliance to automatically create and selectively commence a cycle of operation of the consumable according to the recipe book. Another system in the prior art may provide a cooking appliance that may include one or more heating elements; a cooking chamber; and a camera attached to the interior of the chamber. The cooking chamber may prevent any visible light from escaping the chamber (e.g., the cooking chamber is windowless), the heating elements are controlled by a computing device in the cooking appliance, and the output of the camera may be used to adjust heating pattern of the heating elements. There are robotic cooking kitchens inventions which comprises of methods, computer program products, and computer systems for instructing a robot to prepare a food dish by replacing the human chefs' movements and actions. In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
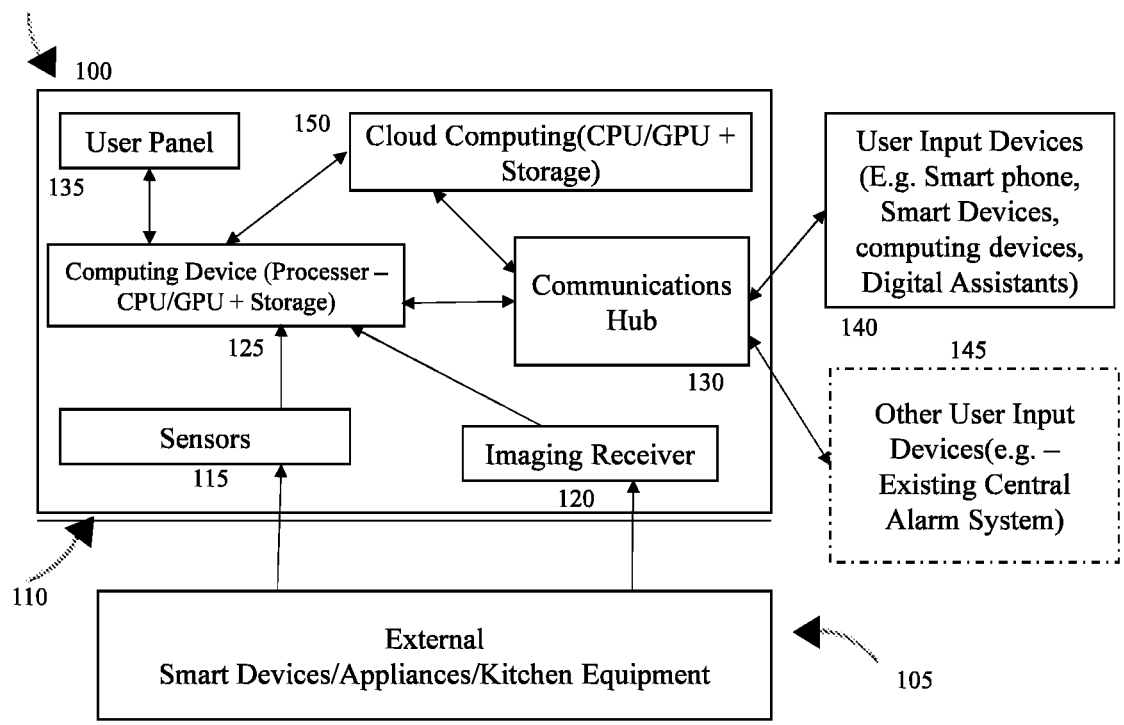
FIG. 1 illustrates an integrated adaptive auto learning system for cooking operations and pre-hazard monitoring in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see *Ex parte Mallory,* 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See *Energy Absorption Sys., Inc.* v. *Roadway Safety Servs., Inc.,* Civ. App. 96-1264, slip op. at 10 (Fed. Cir. Jul. 3, 1997) (unpublished) *Hybridtech* v. *Monoclonal Antibodies, Inc.,* 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See *Seattle Box Co.* v. *Industrial Crating & Packing, Inc.,* 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re *Frye,* Appeal No. 2009-006013, 94 USPQ2d 1072, 1077, 2010 WL 889747 (B.P.A.I. 2010) Depending on its usage, the word "substantially" can denote either language of approximation or language of magnitude. *Deering Precision*

*Instruments, L.L.C.* v. *Vector Distribution Sys., Inc.*, 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognized in case law to have the dual ordinary meaning of connoting a term of approximation or a term of magnitude. See *Dana Corp.* v. *American Axle & Manufacturing, Inc.*, Civ. App. 04-1116, 2004 U.S. App. LEXIS 18265, *13-14 (Fed. Cir. Aug. 27, 2004) (unpublished). The term "substantially" is commonly used by claim drafters to indicate approximation. See *Cordis Corp.* v. *Medtronic AVE Inc.*, 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also *Deering Precision Instruments, LLC* v. *Vector Distribution Sys., Inc.*, 347 F.3d 1314, 1322 (Fed. Cir. 2003); *Epcon Gas Sys., Inc.* v. *Bauer Compressors, Inc.*, 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, *Liquid Dynamics Corp.* v. *Vaughan Co.*, 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In *Cordis Corp.* v. *Medtronic AVE, Inc.*, 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In *Anchor Wall Systems* v. *Rockwood Retaining Walls, Inc.*, 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see *Deering Precision Instruments, L.L.C.* v. *Vector Distrib. Sys., Inc.*, 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see *Epcon*, 279 F.3d at 1031 ("The phrase 'substantially constant' denotes language of approximation, while the phrase 'substantially below' signifies language of magnitude, i.e., not insubstantial."). Also, see, e.g., *Epcon Gas Sys., Inc.* v. *Bauer Compressors, Inc.*, 279 F.3d 1022 (Fed. Cir. 2002) (construing the terms "substantially constant" and "substantially below"); *Zodiac Pool Care, Inc.* v. *Hoffinger Indus., Inc.*, 206 F.3d 1408 (Fed. Cir. 2000) (construing the term "substantially inward"); *York Prods., Inc.* v. *Cent. Tractor Farm & Family Ctr.*, 99 F.3d 1568 (Fed. Cir. 1996) (construing the term "substantially the entire height thereof"); *Tex. Instruments Inc.* v. *Cypress Semiconductor Corp.*, 90 F.3d 1558 (Fed. Cir. 1996) (construing the term "substantially in the common plane"). In conducting their analysis, the court instructed to begin with the ordinary meaning of the claim terms to one of ordinary skill in the art. *Prima Tek*, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp.* v. *Sollac*, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp.* v. *Micron Separations, Inc.*, 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC* v. *Crane Cams Inc.*, 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In *Andrew Corp.* v. *Gabriel Elecs. Inc.*, 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc.* v. *Envirochem, Inc.*, 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc.* v. *Envirochem Inc.*, 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see *Pall Corp.* v. *Micron Seps.*, 66 F.3d 1211, 1217, 36 USPQ2d 1225, 1229 (Fed. Cir. 1995); see, e.g., *Andrew Corp.* v. *Gabriel Elecs. Inc.*, 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see *Ex parte Mallory*, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re *Hutchison*, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicant submits that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. sctn. 112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

Embodiments of the invention disclosed herein relate to relate to a system and method for optimal cooking operations and pre-hazard monitoring. More particularly the system and method disclosed herein relate to a system and method for optimal cooking operations and pre-hazard monitoring using continuous and adaptive machine learning enabling user specific and customizable optimizable, specific, and customizable cooking operations, and identification of pre-hazardous and user specific non-optimal conditions that may arise during cooking operations. Accordingly, in one embodiment, is provided a user focused system and method for an optimal cooking operation by effective combination of human intervention through machine-based assistance, and computing and sensor based automated notifications. The system and method may in one embodiment, employ a pre-configured library of applicable configurations for available recipes and notify a user on an as needed basis about a combination of factors including, but not limited to, overall cooking time duration in increments for each/set of ingredients, real time intelligence and correlation of "cooking state" change of each /most of the ingredients vis-à-vis optimal state (color determination and correlation with texture) as stored in database and interpreted by the trained algorithm per ingredient/combination of ingredients, and the like. The system and method disclosed herein may in certain embodiments employ an array of sensors and adapters, for example, a kitchen appliance knob position indicator to sense the data in the kitchen environment to develop contextual awareness including, but not limited to, the type of food, the size of the utensil, the volume and/or weight of the food, and burn rate based on the position of the burner knob, and the like. The system and method disclosed herein may in certain embodiments, employ an array of computing and storage devices to interpret the cooking operations data to match up the current cooking/heating operation with available pre-configured and stored data to be able to notify users through a unified communications hub or an existing third-party communication channel. The system and method disclosed herein may in certain embodiments employ an array of computing and storage devices to interpret the data in real-time through a combination of computer processing and adaptive artificial intelligence in the form of continuously trained algorithms to notify users through a unified communications hub or an existing third-party communication channel. The system and method disclosed herein in certain embodiments may enable users to use pre-configured data and also save or update cooking operation settings for future purposes and in an optional cooking community library. The system and method disclosed herein in certain embodiments may enable users to share data on their optimal cooking operations/ preference settings with a cooking community formed by users including, but not limited to, recipes, volume and weight of ingredients, burner intensity, type and volume of utensils, and the like.

Herein, the term or terms cooking operation may include but not limited to a variety of cooking operations like dry heat cooking, for example, broiling, grilling, roasting, baking, sautéing, shallow frying, deep frying, etc.; moist heat cooking, for example, poaching, simmering, boiling, steaming, etc.; and combination cooking, for example, braising, stewing, alternating heating and cooling operation e.g. to create custom yogurt the milk has to be heated and cooled down to a particular temperature for the cultures to work properly. Further, in large scale commercial operations such as hotels and cafeterias; the system will have the capability to notify the chef/s who prepare multiple dishes for multiple people having multiple preferences (in multiple burners) such as rare, medium rare, medium and well cooked steak at different times to ensure optimal cooking. This will also allow the chef/s to multitask such as preparing the sauce, a side dish or salad. The alert sent for each user will alert the chef to turn over the beef steaks at different times for different users.

Referring to FIG. 1, is illustrated an integrated adaptive auto learning system 100 for cooking operations and pre-hazard monitoring in accordance with an embodiment of the present invention. Accordingly, FIG. 1 illustrates various components of the integrated adaptive auto learning system 100 including at least one sensor, at least one receiver, a communication device, a computing device, and a database (storage). The integrated adaptive auto learning system 100 may proactively engage or react when a receiver or a combination of data received from at least one sensor component may receive a signal for a cooking operation or a pre-hazardous or a non optimal or an emergency condition is detected. An action on an external equipment 105, for example, a cooking appliance with the knob markers, or action taken via a smart device, or action taken on a kitchen equipment, from which the integrated adaptive auto learning system 100 senses a cooking/heating operation. Core components, for example, the sensor inputs may be included in a physical encasement 110. It may be appreciated by a person with ordinary skill in the art, in light of and in accordance with the teachings of the present invention, that the physical encasement need not include all the components in one physical deployment of the integrated adaptive auto learning system 100. One of the core components includes a sensor 115. In various embodiments, the sensors may include but may not be limited to a heat sensor to detect temperature or a temperature gradient; a gas sensor to detect gas concentration or different types of gases for example carbon dioxide gas, carbon monoxide gas, hydrogen sulfide gas, and the like gases emanating in a cooking environment; a motion detection sensor; a weight sensor; imaging sensor, odor sensor with a chemical analyzer based on odor, and the like. The core components 110 may also include a image receiver which may collect audio visual input, including but not limited to, audio and video and photographic images of activities relating to a cooking operation, for example, a vessel or a kitchen cookware, ingredients used for cooking, state of the food, position of controls of the kitchen equipment, for example, a knob of a cooking range with reference to a marking indicating the position of the control, for example, high, low medium, and the like; clicking of the knob, for example, to start the gas flow or to start and light the gas flow, sound of placing a vessel or a food item on a cooking appliance, and the like. State of the food means the chemical state of the food that changes with application of heat, water, spices amongst other things. Example—sensing (and alerting the user) that the food is getting burnt through sensing browning/blackening of food, alerting the user that the steak is cooked to a medium rare state based on the color of the steak, sensing the optimal texture for chewing—e.g. Chicken , Shrimp, Vegetables—through color change (gradient change) of the ingredients, also factoring in color impact of the spices. Braising, simmering, roasting, grilling is accompanied by different degrees of color and texture changes through the time of cooking, intensity of heat, type of vessels and other factors. Prediction of optimal state through color, and also including the impact of added ingredients on the color requires combination of algorithms and models included but not limited to Computer Vision and Regression algorithms. In another category of food, the amount of liquid is also key to determine the state of the food, e.g. simmering, stew and Jambalaya (mix of vegetables, meat and sauces).

The core components may also include a computing device 125. The computing device 125 may include a processor for processing pre-existing data in the database (storage) as well as current data being gathered from the sensors and receivers. In one embodiment, the processor may compare past stored cooking operation data to interpret and deduct a user's optimal cooking operation timing for various kinds of food. In certain embodiments the processor may process the alarm when a trigger value is reached and/or exceeded (i.e. "=/> than an alert trigger value"). The storage in the computing device may store pre-fed data and continue storing current data being gathered from the sensors and receivers during current cooking operations. Based on the functionality mentioned within the description of the computing device 125; notification may be continuously driven to a communication hub 130 based on the configured settings and preferences of the user.

The communications hub 130, i.e., a controller, may be in working communication with the computing device 125 and a user configured user input device 140, 145 and may be responsible for communicating between the computing device 115 and the user input devices 140, 145, for example, a smart device or home/central alarm system, and the like. In an exemplary embodiment, such a working communication may include, but not be limited to, notification of completion of pre-set time of steps during a cooking operation.

The core component 110 may also include a user input panel, for example, a user console, a remote or smart app on a smart device, and the like within the integrated adaptive auto learning system 100 that may enable switching on/off of different functionalities of the integrated adaptive auto learning system 100, for example, monitoring, triggered alarms, change in pre-set cooking time, and the like.

As mentioned herein above, the communications hub 130 may be in working communication with the user inputs devices 140, for example—e.g. computers, mobile and/or smart devices or digital assistants Google® Nest, Amazon® Alexa, or any other remote control devices for interacting with the integrated adaptive auto learning system 100 to command and trigger the switching on/off of different functionalities of the integrated adaptive auto learning system 100 such as monitoring, triggered alarms , change in pre-set cooking time, and the like. Other user input devices 145, for example an existing central alarm system, may also be in working communication with the communications hub 130, and be accordingly configured to interact with the integrated adaptive auto learning system 100. In one embodiment, the integrated adaptive auto learning system 100 may also include a central cloud computing platform 150, in the core components 110, for centralized computing and storage. The central cloud computing platform 150 may include the central repository for storing the latest snapshot of the trained integrated adaptive auto learning system 100 for users for backups as well as for performing certain functions, for example, image recognition and pattern matching for the state of the cooking/heating state/phase. It may be appreciated by a person with ordinary skill in the art, in light of and in accordance with the teachings of the present invention, that the local computing device may allow for faster storage and also enable user preference about place of storing audio/visual input gathered from the devices.

Figure 2:
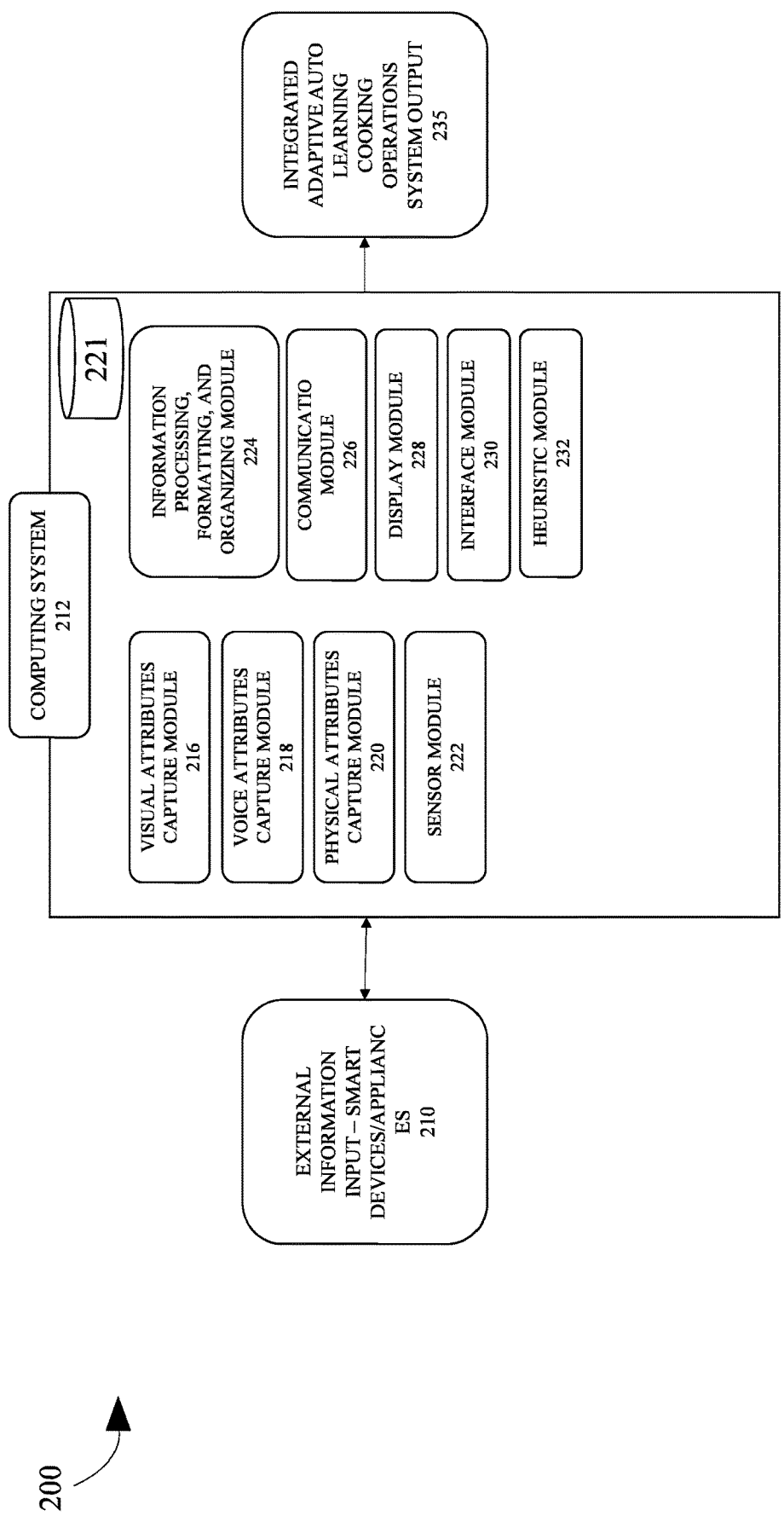
FIG. 2 illustrates an architecture for integrated adaptive auto learning system for cooking operations and pre-hazard monitoring in accordance with an embodiment of the present invention.

Referring to FIG. 2 is illustrated an architecture 200 for an integrated adaptive auto learning system for cooking operations and pre-hazard monitoring in accordance with an embodiment of the present invention. An auto learning system architecture 200 may comprise a computing system 212. The computing system 212 includes a visual attributes capture module 216, a voice attributes capture module 218, a physical attributes capture module 220, a sensor module 222, a database module 221, an information processing, formatting, and organizing module 224, a communication module 226, a display module 228, an interface module 230, and a heuristic module 232. The visual attributes capture module 216, may have a means of capturing an image (still and moving image), such as, without limitation, a camera 114 or virtually any camera, of an environment or external input devices 210. The voice attributes capture module 218, may have a means of capturing the voice, such as, without limitation, a voice recorder 118 or virtually any voice recorder, of the environment or external input devices 210. The user movement attributes, may have a means of capturing and interpreting user movements and actions. For example, once the association is done and a recipe match is set, to cook chicken stew the requirement would be for the user to attend to the cooking/heating operation at various points of elapsed time during the entire/end to end cooking operations. The user would $1^{st}$ sauté the chicken in butter, add certain vegetables such as carrots and potatoes, add broth and spices and finally add few other vegetables such as celery at a later stage of cooking. Based on the user movement (such as addition of water) and other factors such as burn rate of the cooking range; the system can predict and alert the user that it is time to add celery. Also, if the user comes by (without an alert) to check on the cooking operation; the system would be able to detect user movement and can send an alert to the user asking if the next scheduled notification should be delayed since the user already checked on the cooking operation. The physical attributes capture module 220, may have a means of capturing the physical attributes, such as, without limitation, gathers information on the weight, volume of food/ingredients/vessels etc. being used to make a recipe. The sensor module 222, may have a means of sensing various parameters involved in cooking, such as, without limitation temperature, temperature gradient, gas sensors, light sensors, humidity sensors, motion sensor, weight sensors, and the like, either gathers information on the sensed parameters. Information processing, formatting, and organizing module 224 may have a means of processing an image, a voice, and the gathered physical information and sensor information, such as, without limitation, a processing unit, a computer, or a server to execute computer code and/or algorithms from a non-transitory computer readable medium for image, voice, physical attributes, and sensor parameter recognition. A display module 228 may have a means to display to the user 234 who may be enabled to view the output 236 provided by the integrated adapting auto learning system various alerts, including cooking operation alerts, thus enabling the user to take the next course of action. An interface module 230 may have a processing means such as, without limitation, a processing unit, a computer, or a server to execute computer code and/or algorithms from a non-transitory computer readable medium for interfacing between the various modules. A heuristic module 232 may have a processing means such as, without limitation, a processing unit, a computer, or a server to execute computer code and/or algorithms from a non-transitory computer readable medium for processing the data/information provided by the data analyzing module and providing pointers to the user based on a self-learning model. It may be appreciated by a person with ordinary skill in the art, in light of and in accordance with the teachings of the present invention, that virtually any algorithm and/or computer code may be used to self-learn using the heuristic module 232. Self-learning algorithms and/or methods may include, without limitation, the use of Artificial Intelligence; however, the development of self-learning algorithms is really the new or current state-of-the-art if coupled with smart sensors and electromechanical systems the opportunities are infinite. The visual recognition and next best action algorithms for Optimal Cooking operations and pre-hazardous and hazardous condition monitoring and alerting system may include but not limited to Supervised learning, Unsupervised learning and Reinforcement learning by leveraging associated algorithms. The Supervised learning algorithms will deliver for example but not limited to Automatic image classification. The unsupervised learning algorithms will deliver similarity detection for example but not limited to identifying a particular recipe based on image recognition and associating with closest match. The reinforcement learning will enable better operations through feedback from the environment, especially where information is a combination of quantitative and qualitative values and the environment is not completely deterministic because the cooking/kitchen environment is extremely dynamic and hence not completely deterministic, to help determine if the recipe is optimally cooked and prepared as per the user preferences. Bayesian Networks and Hidden Markov Models using probabilistic modeling through direct acyclic graphs, Markov chains, and sequential processes. Expectation-Maximization (EM) algorithm with applications such as Gaussian mixture, Principal Component Analysis, Factor Analysis, and Independent Component Analysis for Optimal cooking operations. Hebbian Learning and Self-Organizing Maps with models like Sanger network and Rubner-Tavan network that can perform a Principal Component Analysis without the input covariance matrix. Convolution Neural Networks trained as both Supervised and Unsupervised learning methods will enable Object Detection, Classification and Identification for complex data sets by leveraging past data sets and the compute power (CPU/GPU) in a hybrid cloud network. E.g. Detecting each individual ingredient using a Convolution neural network based on past saved data from library of images and then using a combination of other algorithms (e.g. regression) to associate with the closest recipe matches for suggesting to user for selection or confirmation, or in the lack of response of the user, continuing to make the best judgement of the closest matched recipe and continue to track the progress of the cooking operation and continuously fine tuning based on past learning and also unsupervised learning method to augment the user for an ideal and optimal cooking operation based on tracking the state of the ingredients and the overall cooking condition of the recipe. A combination of algorithms will be deployed to solve multiple use cases in the Optimal Cooking operations process. Integrated adaptive auto learning cooking operation system output 236 may have a processing means such as, without limitation, a processing unit, a computer, or a server to execute computer code and/or algorithms from a non-transitory computer readable medium for receiving, storing, and transmitting the information of the cooking operation to the display module 228 of a user device.

It may be appreciated by a person with ordinary skill in the art, in light of and in accordance with the teachings of the present invention, that one or more modules may be embodied in a single device. In an alternative embodiment of the present invention, all modules except the communication module may be embodied in the computing device of the integrated adaptive auto learning system for cooking operations. The computing device of the integrated adaptive auto learning system for cooking operations may be capable of gathering information on the visual, and vocal attributes of a cooking environment, processing, formatting, and organizing the information, providing a status or alert output to the user as required, and enabling the user to take the necessary action in the cooking process. The information may be related or communicated to the user and received by the user using a personal computer, laptop device, smart phone device may enable the user to tailor the attributes of the cooking information to add, edit, delete, or retain various recipes of the user's choice in the integrated adaptive auto learning system for cooking operations.

It may be appreciated by a person with ordinary skill in the art, in light of and in accordance with the teachings of the present invention, that virtually any algorithm and/or computer code may be used to recognize and capture a visual on the visual attributes capture module 216 and the information processing, formatting, and organizing module 224. Visual recognition algorithms and/or methods may include, without limitation, Bayesian networks, fuzzy logic, neural networks, template matching, Hidden Markov models, machine learning, data mining, feature extraction and data analysis/statistics, optical character recognition, etc. In an alternative embodiment of the present invention, a binary search tree may be implemented to extract data from a visual.

It may be appreciated by a person with ordinary skill in the art, in light of and in accordance with the teachings of the present invention, that virtually any algorithm and/or computer code may be used to recognize and capture a sound/voice on the voice attributes capture module 218 and the information processing, formatting, and organizing module 224. Voice recognition algorithms and/or methods may include, without limitation, Bayesian networks, fuzzy logic, neural networks, template matching, Hidden Markov models, machine learning, data mining, feature extraction and data analysis/statistics, optical character recognition, etc. In an alternative embodiment of the present invention, a binary search tree may be implemented to extract data from a voice.

It may be appreciated by a person with ordinary skill in the art, in light of and in accordance with the teachings of the present invention, that virtually any algorithm and/or computer code may be used to recognize and capture mental and physical attributes of the cooking environment physical attributes capture module 220 and the information processing, formatting, and organizing module 224. Environment recognition algorithms and/or methods may include, without limitation computer vision algorithms including deep learning networks example—convolutional neural networks, feature point extraction, Principal Component Analysis for dimension reduction. Machine Learning Algorithms such as support vector machines, Naïve Bayes, etc. . . .

It may be appreciated by a person with ordinary skill in the art, in light of and in accordance with the teachings of the present invention, that virtually any algorithm and/or computer code may be used to recognize and capture an environmental attribute on a sensor module 218 and the information processing, formatting, and organizing module 224. It may be appreciated by a person with ordinary skill in the art, in light of and in accordance with the teachings of the present invention, that virtually any algorithm and/or computer code may be used to recognize and capture a sound/voice on the voice attributes capture module 218 and the information processing, formatting, and organizing module 224. Surround sense recognition algorithms, for example, for sensing heat, gas, and the like and/or methods may include, without limitation, Bayesian networks, fuzzy logic, neural networks, template matching, Hidden Markov models, machine learning, data mining, feature extraction and data analysis/statistics, optical character recognition, etc. In an alternative embodiment of the present invention, a binary search tree may be implemented to extract data from a sensory information.

Voice recognition algorithms and/or methods may include, without limitation, Bayesian networks, fuzzy logic, neural networks, template matching, Hidden Markov models, machine learning, data mining, feature extraction and data analysis/statistics, optical character recognition, etc. In an alternative embodiment of the present invention, a binary search tree may be implemented to extract data from a voice.

It may be appreciated by a person with ordinary skill in the art, in light of and in accordance with the teachings of the present invention, that there may be a plurality of the same modules in auto learning system architecture 200. A plurality of modules such as, without limitation, visual attributes capture module 216, a voice attributes capture module 218, a physical attributes capture module 220, a sensor module 222, a database module 221, an information processing, formatting, and organizing module 224, a communication module 226, a display module 228, an interface module 230, and a heuristic module 232 may be present in auto learning system architecture 200. The plurality of similar modules may work in parallel or independently to improve the throughput and/or speed auto learning system architecture 200. In an alternative embodiment of the present invention, a plurality of capture, processing, formatting, and organizing, generation, display, interface, communication, heuristic, and storage modules may be connected to an auto learning system for cooking operations and pre-hazard monitoring via wired and wireless connections to access resources from different wired and wireless networks. In still another alternative embodiment of the present invention, a plurality of similar modules may form a secondary auto learning system capable of seamlessly substituting an errant module.

It may be appreciated by a person with ordinary skill in the art, in light of and in accordance with the teachings of the present invention, that one or more modules may transmit capture information to a tech support server that is on an accessible network or over the internet. In an alternative embodiment of the present invention, additional captured information may be sent to a server to alleviate processing load on an auto learning system, for example, if multiple recipes are being cooked or accessed, this may include added features for correction/encryption. This is a part of the core invention, where the architecture supports both a local home network where the sensor devices can connect to a local CPU/GPU combination for EDGE based computing along with a cloud network connection which will allow much better performance and reliability along with scale and storage and for continuous fine tuning of the algorithms and analysis of performance.

It may be appreciated by a person with ordinary skill in the art, in light of and in accordance with the teachings of the present invention, that any module in auto learning system architecture 200 may perform data manipulation. Data manipulation such as, but not limited to, compression, encryption, formatting. In an alternative embodiment of the present invention, any module sending data may first compress the data prior to data transmission.

Figure 3:
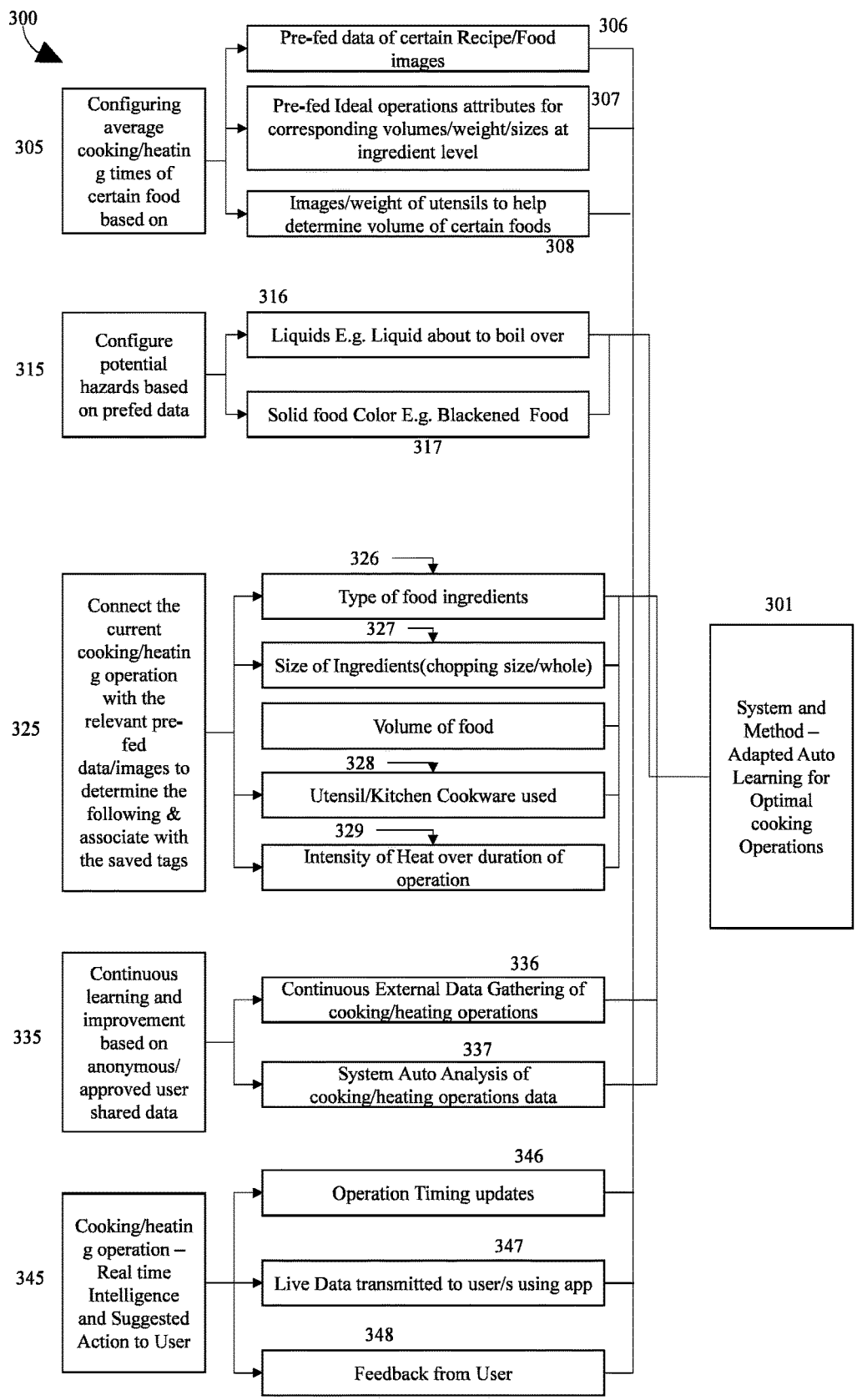
FIG. 3 illustrates an exemplary integrated adaptive auto learning and training system of the integrated adaptive auto learning system of FIG. 1 for cooking operations and pre-hazard monitoring in accordance with an embodiment of the present invention.

Referring to FIG. 3 is illustrated an exemplary integrated adaptive auto learning and training system 300 of the integrated adaptive auto learning system 100 for cooking operations and pre-hazard monitoring in accordance with an embodiment of the present invention. FIG. 3, provides a map of components that comprise the auto and adaptive learning and training capabilities of the integrated adaptive auto learning system 100. The integrated adaptive auto learning and training system 300 may include an algorithm 201 of the integrated adaptive auto learning system 100 that may pertain to auto and adaptive learning and training of the integrated adaptive auto learning system 100. The algorithm in 305 may include the initial component of training the auto learning system 300 specific to user/s used for initial configuration of the integrated adaptive auto learning system 100. The training may be customized by feeding the data (including cooking/heating times) pertaining to preferred recipes and food specific to particular user/s preferences. In order for the integrated adaptive auto learning system 100 to determine an optimal cooking/heating time for specific food's/recipe; such foods/recipes may be tagged by the user/s based on the attributes characterizing the food/recipe and the timing duration that is ideal as per the user/s. Such attributes may include but to be limited to, quantity of the food/ingredients, i.e., the weight and/or the volume of the food/ingredients. The average cooking/heating time of certain food may be configured 305 based on allowing 306 the user/s to select from an initial library of images of food recipes for training the system for commonly used recipes for cooking operations or upload images of user preferred recipes/food. The average cooking/heating time of certain food may be further configured 305 based on allowing 307 the user/s to train the integrated adaptive auto learning system 100 in terms of attributes related to the food/recipe/ingredients for cooking operations and user/s optimal cooking durations for such food/recipe. In an exemplary embodiment, it may be appreciated by a person with ordinary skill in the art, in light of and in accordance with the teachings of the present invention, that in order to further customize for a particular user/s preferences, there is an ability to tag particular food/recipes and customize further in terms of ingredients of the recipe. Each food/recipe may be configured with specific weight /volume associated in terms of the single or multiple ingredients. The user may have the ability to customize an average timing of operation based upon the key ingredients (including weight and/or volume and/or number). The user may be able to save variations of the recipes whenever there is variation at the ingredient level based on user preferences. The integrated adaptive auto learning system 100 may be able to initialize the integrated adaptive auto learning system 100 with initial configuration values with respect to the recipes and the ingredients as shown with references to Examples included below.

EXAMPLE

Base Recipe 1

| Recipe | Ingredients | Volume/Number/Weight | Burner intensity | Time |
|---|---|---|---|---|
| 1 Moist Garlic Chicken | Chicken Breast, Garlic, Black Pepper, Lemon pepper salt, butter or oil, chicken broth (other seasonings can be added) | 1 pound Chicken Breast marinated with seasonings Chicken Broth - 1 cup Garlic - 10 cloves minced | Medium | 16 mins |

User and Integrated Adaptive Auto Learning System 100 Steps

| Step No. | User Action/Cooking Steps | Integrated adaptive auto learning system Steps |
|---|---|---|
| 1 | Melt butter, add seasoned and marinated chicken | Start monitoring, configuring and determining details pertaining to the cooking/heating operation. Match current cooking/heating operation to basic shallow fry chicken recipe |

| Step No. | User Action/Cooking Steps | Integrated adaptive auto learning system Steps |
|---|---|---|
| 2 | Leave chicken on one side to brown on low heat | 2a) Integrated adaptive auto learning system may tag this step to a 3 minute cooking/heating timing requirement and alerts user upon completion of 3 mins. 2b) The timing for sending alert for completion of this step may be changed if the burn rate is different from the pre-fed data that currently exists in the Integrated adaptive auto learning system's knowledge repository. Example - Alert will be sent (to turn the chicken) at 1.5 mins instead of 3 mins if the burner is set on medium instead of low. |
| 3 | User turns the chicken | 3a) Integrated adaptive auto learning system may tag this step to a 3 minute cooking/heating timing requirement and alerts user upon completion of 3 mins. 3b) The timing for sending alert for completion of this step may be changed if the burn rate is different from the pre-fed data that currently exists in the Integrated adaptive auto learning system's knowledge repository. Example - Alert will be sent (to turn the chicken) at 1.5 mins instead of 3 mins if the burner is set on medium instead of low. |
| 4 | User add Garlic and Chicken broth | Integrated adaptive auto learning system may tag this to recipes such as Moist Garlic Chicken, Moist Ginger Chicken, Moist chicken with herbs. Integrated adaptive auto learning system may tag this as a 10 mins requirement for 1 cup of liquid to evaporate on low burner. Alerts user after 10 minutes. |

Base Recipe 1 with Variation

| | |
|---|---|
| User adds a variation | The timing for sending alert for completion of this step may be changed if the Integrated adaptive auto learning system 100 detects variability from the pre-fed data that currently exists in the Integrated adaptive auto learning system's 100 knowledge repository. However, time for alert may vary depending on several parameters such as: based on pre-fed data and past learnings; the Integrated adaptive auto learning system may process different cooking times based on variances. Example - timing set for 10 soft-boiled eggs will be 8 minutes. For 20 eggs, the timing will be set for 12 minutes. If vegetables are added, the timing for sending alerts will be changed by the System and Method. Such changes may be based on the approximate volume/weight of food being cooked/heated. Example if ½ a pound of broccoli is added to the recipe described in "Base Recipe 1", the Integrated adaptive auto learning system may update the timing from 16 minutes to 19 minutes. In certain embodiemnts, the timing may also be manually changed by a user. In embodiments wehre the integrated adaptive auto learning system may sense (through its various sensors) browning or burning of food; it will immediately override the initial configured duration for cooking/heating and immediately notify/alert the user. |

In one embodiment, the user/s may be allowed 308 to pre-feed data/further update data in the integrated adaptive auto learning system 100 pertaining to commonly used utensils/cookware used by the user/s. The integrated adaptive auto learning system 100 may record unique attributes of such utensils/cookware such as utensil image, type (example: cast iron, stove-top glassware, steel etc.) weight and volume. In one embodiment, this may enable the integrated adaptive auto learning system 100 to be contextually aware of the utensil/kitchenware being used for cooking/heating operation. It may be appreciated by a person with ordinary skill in the art, in light of and in accordance with the teachings of the present invention, that there may be instances where a new type of utensil/kitchenware may be used and data may not fed/updated by the user. In such instances; the integrated adaptive auto learning system 100 may alert the user/s that a new type of utensil/kitchenware is being used and will also configure possible attributes based on the data that the integrated adaptive auto learning system 100 updates at that specific point in time. The integrated adaptive auto learning system 100 further may include an algorithm 315 that may enable the user to initially train the integrated adaptive auto learning system 100 on optimal, potential pre-hazard and hazardous conditions. In steps 316 and 317, the integrated adaptive auto learning system 100 may be preloaded with a library of images pertaining to potentially hazardous/hazardous cooking/heating conditions, for example liquids (such as stews and soups) boiling over, blackened or charred food, and the like. The user/s may also feed data and details, i.e., images and other parameters that constitute over-cooking/heating and/or non-ideal cooking/heating parameters, into the integrated adaptive auto learning system 100. An alogorithm 325, may allow for continuous learning and updates the knowledge repository of the integrated adaptive auto learning system 100 based on real time learning and intelligence gathered from the cooking/heating operations. In step 326, integrated adaptive auto learning system 100 may auto tag the cooking/heating operation underway to the closest match in the preloaded library/pre-fed and stored data and may ask user for optional confirmation. The user may have the option to confirm or to make changes. Such changes may include, but not be limited to, a change in the recipe tag, for example, shallow fry chicken to shallow fry garlic chicken with broccoli, and/or a change in the duration of the cooking/heating operation, and the like. If the optional confirmation is not provided by the user, the integrated adaptive auto learning system 100 may default to the closest match in the preloaded library/pre-fed and stored data. In steps 327 and 328 the respective algorithms may perform analysis of data received from sensor and/or imaging receiver to determine other relevant parameters such as approximate volume and/or weight of food, type of utensils/kitchenware. In step 329, an alogorithm may assist the integrated adaptive auto learning system 100 to continuously learn, store, and make updates to the knowledge database. In one embodiment, such learning and updates may include the variability factor of foods/recipes. In various exemplary embodiments, the variability factor may include but are not limited to the number/volume of the food, added ingredients, variability in kitchen utensil/cookware and the burn rate and intensity of the heat in the cooking/heating operation. In step 335, the system may enable continuous auto learning and improvement of integrated adaptive auto learning system 100 based on the following: In step 336, the integrated adaptive auto learning system 100 may optionally, i.e., if the user sets a preference for the integrated adaptive auto learning system 100 to learn from shared data, integrate and learn from data shared over the cloud by approved users who are a part of the network of integrated adaptive auto learning system 100 community. In step 336, the integrated adaptive auto learning system 100 may perform background system auto analysis of data gathered from cooking/heating operations and also from optional learning from data shared over the cloud by approved users who are a part of the network of integrated adaptive auto learning system 100 community. In step 336, the integrated adaptive auto learning system 100 community either on the cloud or locally on the integrated adaptive auto learning system 100 and may update the knowledge repository regarding the recipes, foods, ingredients and associated attribute information. In step 345 the integrated adaptive auto learning system 100 may enable a method of providing real time intelligence and status updates about the cooking operations to the user and can re-compute the cooking/heating operation and/or enable the user to make certain changes as described further in steps 346 and 347. In step 346, the integrated adaptive auto learning system 100 may make real-time updates to the time-duration of heating/cooking activity. For e.g.—If the burner is set from medium to low while the cooking/heating operation is underway, the integrated adaptive auto learning system 100 may recalibrate the timing/duration for the cooking/heating operation and recompute and adjust duration of all the subsequent steps of the recipe plan execution and accordingly change all the notifications for all the steps. In step 347, the integrated adaptive auto learning system 100 may have the capability (based on user preference) to transmit live audio/video/images of the cooking/heating operation to the user. The user may re-set the optimal cooking/heating time remotely so that the alerts are accordingly reset. In step 348, the integrated adaptive auto learning system 100 may allow the user to provide feedback based on the completed cooking/heating operations. Such feedback may be used to re-calibrate, re-learn and reconfigure cooking/heating time for cooking/heating operations of various foods.

Figure 4:
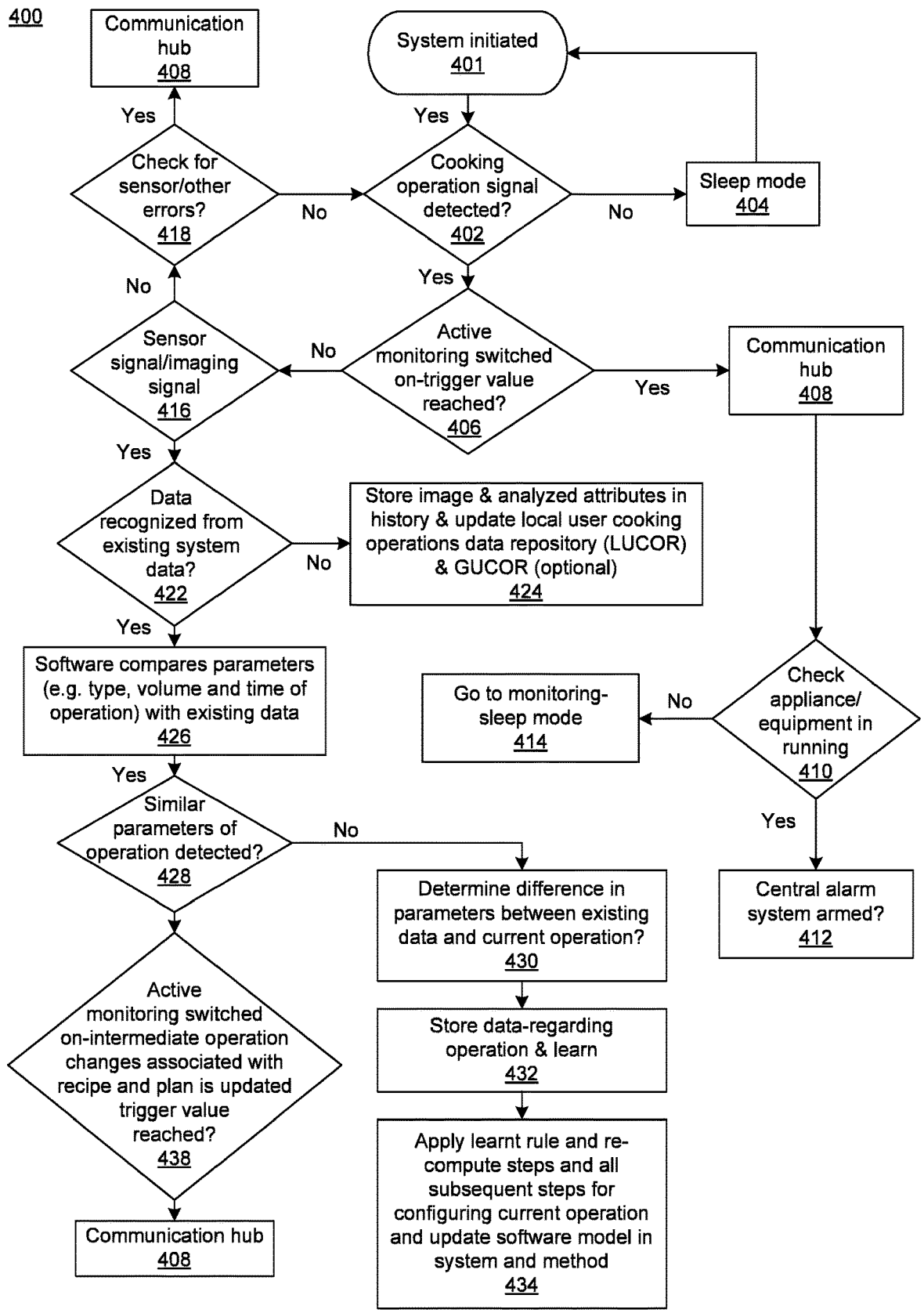
FIG. 4 illustrates a process flow chart of a method for an integrated adaptive auto learning system for cooking operations and pre-hazard monitoring in accordance with an embodiment of the present invention.

Referring to FIG. 4 is illustrated a process flow chart of a method for an integrated adaptive auto learning system for cooking operations and pre-hazard monitoring in accordance with an embodiment of the present invention. In step 401, the integrated adaptive auto learning system may detect an action whereby the system may be initiated, i.e., the system wakes up from a sleep position based on automatic (sensor based) or manual (example through an action taken in a smart device/appliance) to commence monitoring. In step 402, the integrated adaptive auto learning system may commence the monitoring based on the initiation of a cooking operation which can be triggered through different parameters but not limited to: (i) detection of the clicking sound from the cooking appliance lighter/switching on operation; (ii) detection of gas in case of a leakage; (iii) detection of motion around the area of coverage by sensors of the integrated adaptive auto learning system indicating that cooking/heating operation may be commenced (iv) selection/tagging of ingredients and association with a recipe in a smart device/appliance and communicating to the integrated adaptive auto learning system to initiate a cooking operation for a particular recipe. In an event that images described in step 402 indicate that that there may be no actual cooking/heating operation; the integrated adaptive auto learning system may proceed to step 404. Step 404 is the sleep mode which commences when the integrated adaptive auto learning system detects "idle time" pertaining to cooking/heating operations. In an event that the audio/video/image interpretation by the integrated adaptive auto learning system described in step 402 above reveals that there is an actual cooking/heating operation that has commenced step 406; then the integrated adaptive auto learning system may check to determine if any trigger value is reached in step 406. Examples of trigger values include gas leakage, burners left switched on inadvertently without actual cooking/heating vessels or operations. The integrated adaptive auto learning system may interpret vapors intensity combined with the duration of operation or color of the foods, for example, blackened rice, vegetables, etc. as a pre-hazard condition. The integrated adaptive auto learning system may also be able to recognize from imaging data in case an equipment is still running unintentionally by a combination of fumes, temperature differential and from imaging of empty utensils on the kitchen equipment. In one embodiment, if the trigger has been reached, the integrated adaptive auto learning system may trigger the alarm/communicate with and notify the user input devices that a trigger has been reached.

As a part of step 406, the integrated adaptive auto learning system may use a plurality of sensors to continuously track the cooking operation and update the variables in order to determine the overall recipe plan, for example, through the continuous real time tracking of the kitchen environment through a combination of motion sensors, audio, visual sensors, odor sensors and updating the recipe ingredients status and communicating to the overall integrated adaptive auto learning system regarding any change to a particular recipe in terms of any of the attributes, including but not limited to quantity of ingredients, substitute ingredients, temperature for adding various ingredients, time period for adding various ingredients. For example, if broccoli is added to sautéed boneless chicken thigh cubed pieces; the system would update the recipe match and increase the alert for the cooking time accordingly.

If the trigger described in Step 406 is reached, in step 408; the communication hub may notify or communicate with configured user input devices (such as a smart device or home/central alarm system) to communicate. In exemplary embodiments, such communication may include but not be limited to, notification of completion of pre-set time of cooking/heating operation and alarms pertaining to potentially hazardous conditions such as gas leakage etc. In step 412, a type of configured "external" user input device such as home/central alarm system may be triggered by a corresponding event (such as people leaving the house, switching the alarm on etc.). In the event the configured "external" user input device such as home/central alarm system, set forth in Step 412 is triggered the integrated adaptive auto learning system in step 410 may immediately check if there are any cooking/heating operation going on at that specific point in time. Upon checking if the integrated adaptive auto learning system senses cooking/heating operation going on at that specific point in time, the communication hub may (as described in Step 408) immediately notify or communicate with the configured user input devices (such as a smart device or home/central alarm system). Such communication would include notification of the current cooking/heating operation. In an event, where upon checking; if the integrated adaptive auto learning system does not sense cooking/heating operation going on at that specific point in time, in step 414, the integrated adaptive auto learning system may automatically proceed to a sleep mode. In the event that the images (described in Step 402 above) reveals that there is an actual cooking/heating operation that has commenced; however, the trigger value (e.g. gas leakage) is not reached; in step 416 the integrated adaptive auto learning system may intake data pertaining to the cooking/heating operation such as images, volume and weight depending on the type of food and the sensors that are activated. Such data may be immediately stored locally and time stamped in the storage within the integrated adaptive auto learning system. In the event that the data (including but not limited to images, weight etc.) are not received by the integrated adaptive auto learning system, in step 418 the integrated adaptive auto learning system immediately checks for sensor or other errors. Upon detection of error/s described in Step 418 above; the communication hub (Step 408) immediately notifies or communicates such error to the configured user input devices (such as a smart device) in step 420. After the integrated adaptive auto learning system successfully intakes data pertaining to the cooking/heating operation such as images, volume and weight depending on the type of food and the sensors that are activated as described in step 416; the processor analyzes and decodes the data against historical stored data available to the integrated adaptive auto learning system in step 422.

In the event the processor, does not find a match between the latest data pertaining to the food being cooked/heated with historical data by using image recognition/available data processing through the integrated adaptive auto learning system—machine or heuristic learning software capability; it stores the data in the storage or knowledge repository to perform future co-relation in step 424.

In step 426, upon finding a valid match between the latest data pertaining to the food being cooked/heated with historical data by using image recognition/available data processing through the integrated adaptive auto learning system—machine learning software capability; the Software (including rules and algorithms) compares the latest data pertaining to the food being cooked/heated (such as volume and weight) with historical data (based on stored data or based on pre-set ideal cooking time input from user) by using image recognition/available data processing through the integrated adaptive auto learning system—machine learning software. For example, while the integrated adaptive auto learning system is capable to interpret from the kitchen knob positions, a permanent sticker/knob cover to the off position on the control knob and based on the relative position of the sticker on the control knob, the processer may determine the gas burn rate.

In step 428 the process based on the comparison run as described in step 326 above may attempts to find similar parameters between the latest image/data pertaining to the food being cooked/heated with historical data by using image recognition/data processing through artificial intelligence capability. Similar parameters pertain to key attributes including but not limited to the type of food, the size of the utensil, size of the ingredients, the volume and/or weight of the food, and burn rate based on the position of the burner knob.

In step 430, the processor may determine the parameter differences between the latest data pertaining to the food being cooked/heated with historical data by using image recognition/available data processing through the integrated adaptive auto learning system—machine learning software or based on pre-set ideal cooking time input from user. In various exemplary embodiments, differences in parameters pertaining to key attributes may include but not limited to the size of the utensil, the volume and/or weight of the food, and burn rate based on the position of the burner knob).

In step 432 the parameter differences (described in Step 430 above) may be stored so that the integrated adaptive auto learning system can learn for future use purposes. Data stored pertains to co-relating the image with different weights, volumes and other attributes. For example, conditions for 6 soft boiled large eggs vs. 10 soft boiled large eggs.

In step 334, based on learning from prior operations (based on stored data and images or based on pre-set ideal cooking time input from user) and the parameter differences, the integrated adaptive auto learning system may determine the best prediction for optimal cooking/heating time duration of the food that is being cooked/heated. Once the predicted optimal cooking/heating time duration of the food that is being cooked/heated is completed, the communication hub (as described in Step 408) may notify/alert or communicate with configured user input devices (such as a smart device or home/central alarm system) to communicate. In various exemplary embodiments, such communication may include notification of completion of predicted optimal cooking/heating operation for the food that is being cooked/heated.

In step 438, the processor may determine that the parameter between the latest image/data pertaining to the food being cooked/heated and the historical data are significant similar for key attributes (including but not limited to the type of food, the size of the utensil, the volume and/or weight of the food, and burn rate based on the position of the burner knob). Based on such determination; the processor may set the optimal cooking/heating time for the food that is currently being cooked/heated. For example, conditions for cooking 1 cup of rice or addition of vegetables to rice.

In the event that the integrated adaptive auto learning system is not able to receive real time imaging data (example: due to an opaque lid or cover on the utensil/cookware) and hence unable to interpret exact status of the cooking/heating operation, the integrated adaptive auto learning system may use the standard configuration values based on the initial images of the cooking/heating operation and may accordingly determine an optimal cooking/heating time for the food that is currently being cooked/heated. After aggregating the overall duration of time required to perform an optimal cooking operation based on the past record of the time taken based on the ingredients originally sensed during the beginning of the operation, the Communications hub will notify both in an interim intervals to intervene by opening lid and perform measures like stirring operation or adding other ingredients -e.g. spices or adding other ingredients like vegetables or meat or fish etc.

Once the optimal cooking/heating time duration of the food that is being cooked/heated is completed, the communication hub (as described in Step 408) may notify alert or communicates with configured user input devices (such as a smart device or home/central alarm system) to communicate. Such communication would include notification of completion of optimal cooking/heating operation for the food that is being cooked/heated.

Figure 5:
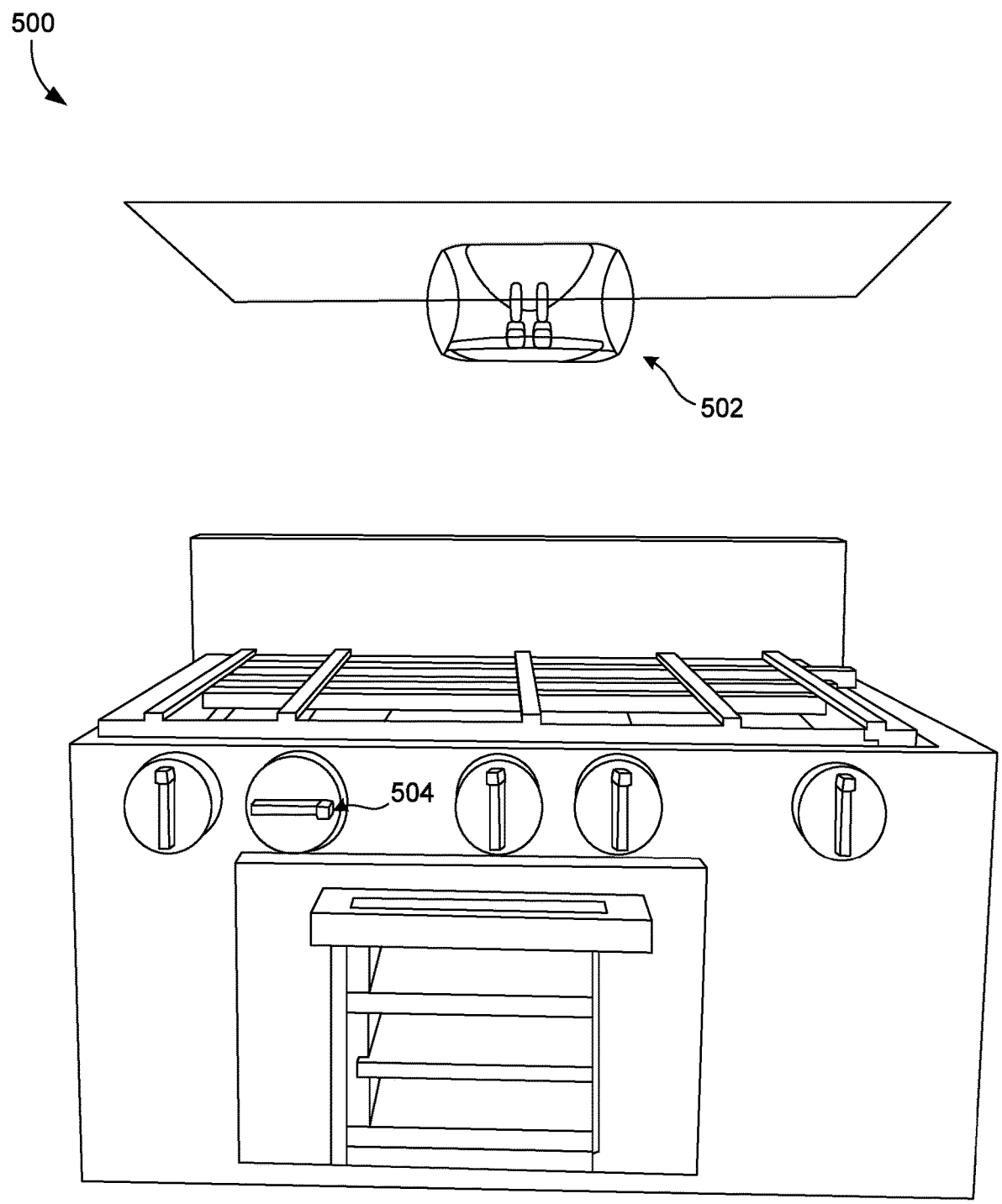
FIG. 5 illustrates an exemplary lay out of an integrated adaptive auto learning system for cooking operations and pre-hazard monitoring in accordance with an embodiment of the present invention.

In one embodiment, the integrated adaptive auto learning system may store the data locally as per the user preferences and develops a knowledge repository also called its "Local user cooking operations repository (LUCOR)" which may be a copy of images and other key attributes relevant and personalized for the user. The integrated adaptive auto learning system as per the user preferences may also have a centralized global user cooking operations repository (GUCOR) and keeps it refreshed in the cloud which includes the LUCOR with any additional data and algorithm enrichment. The integrated adaptive auto learning system may also have a Global Cooking Operations Repository (GUCOR) which may have the software algorithm and user shared recipes for initial configuration and setup for new users. The integrated adaptive auto learning system may have the ability to work completely in an offline mode without replication, however the integrated adaptive auto learning system should have communications channels intact in order to connect to the configured communication mediums, e.g. mobile application, connecting to external alarms, calling preset telephone numbers, and the like. In an exemplary embodiment, in order to easily interpret when to consider as the starting point for a cooking operation from the images received, the method may require to attach a permanent sticker/knob cover to the off position on the control knob and based on the relative position of the sticker on the control knob, the processer may determine the gas burn rate and the state of operation of the burner in the kitchen appliance. In step 426, the processor may compare and determine against historical images and find the closest match in terms of the image attributes by using image recognition artificial intelligence capability. If it doesn't find a match the processor may stores the image as a part of this event for future matches and start the internal timer/derives from the internal clock for measuring the time of the duration for this operation. Only images that are finally considered as the initial starting point before a cooking operation is considered as commenced are stored in the operations repository (Local/Global). Each image is stored with key attributes for example <Type of Operation>—Warming, Cooking meat, stir fry, Boiling <Total Time of Operation>—20 minutes <Menu Name>—library maintained e.g. Chicken Stir Fry, Omlette <Utensil volume>—1, 2 or 5 Quarts Referring to FIG. 5 is illustrated an exemplary lay out 500 of an integrated adaptive auto learning system for cooking operations and pre-hazard monitoring in accordance with an embodiment of the present invention. Accordingly, FIG. 5 is a depiction of one of the forms and structures of the integrated adaptive auto learning system, and also depicts a possible area to place the integrated adaptive auto learning system.

As shown in FIG. 5, location 502 may include one of the ways that the integrated adaptive auto learning system may be placed over the cooking appliance/range. It may be appreciated by a person with ordinary skill in the art, in light of and in accordance with the teachings of the present invention, that for clarity in abstracting sensor data the form, structure as well as the placement of the integrated adaptive auto learning system may vary based on various parameters such as the type of camera, shape of the encasement, whether the integrated adaptive auto learning system is placed under a hood, a microwave oven or as a separate overhanging attachment from the roof, and the like. FIG. 4 also shows one the knob markers 504 which forms a component of the integrated adaptive auto learning system placed on the knob of the burner switch.

Figure 6:
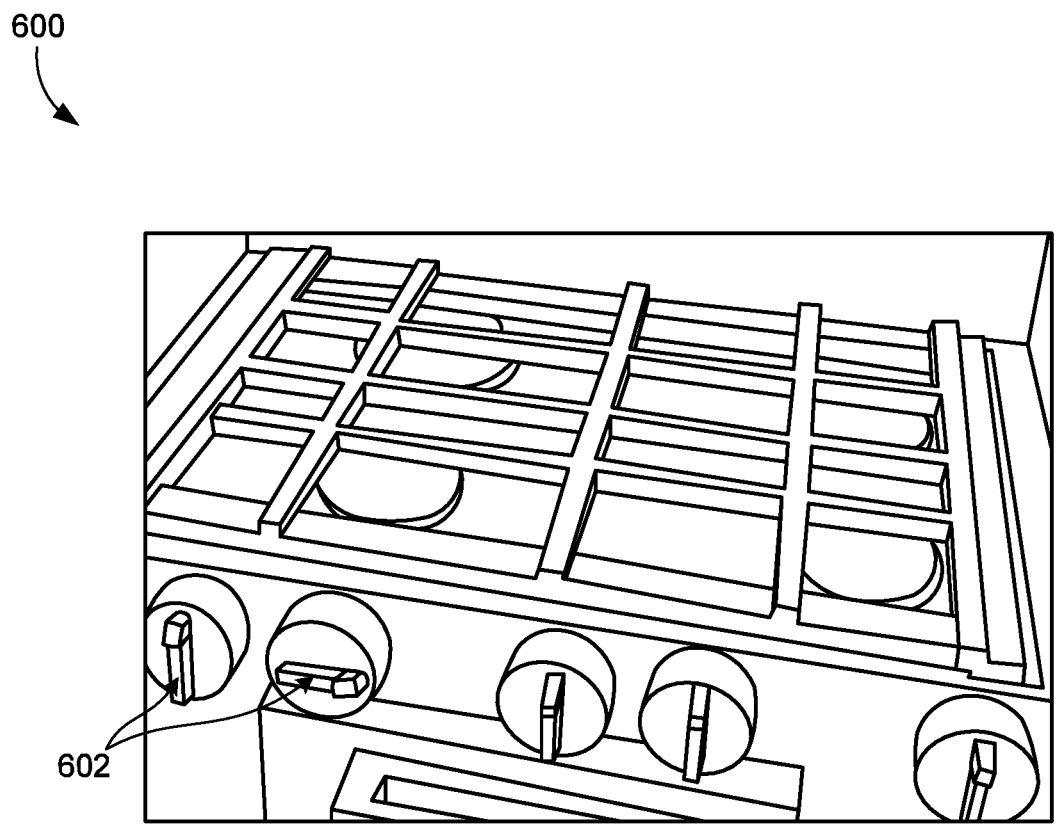
FIG. 6 illustrates an exemplary portion of an integrated adaptive auto learning system for cooking operations and pre-hazard monitoring in accordance with an embodiment of the present invention.

Referring to FIG. 6 is illustrated an exemplary portion 600 of an integrated adaptive auto learning system for cooking operations and pre-hazard monitoring in accordance with an embodiment of the present invention. Accordingly, FIG. 6 is the depiction of a potential form and structure of the knob marker which forms a component of the integrated adaptive auto learning system. In the exemplary embodiment, shown in FIG. 6, the knob marker is an attachment/cap/sleeve that may be added on top of the knob which may be required for accurate interpretation, by the integrated adaptive auto learning system of the knob's position during the cooking/heating operation to determine burner's burn rate (low, medium or high). Different positions of the knob marker 602 are shown that may be used by the integrated adaptive auto learning system to interpret and determine burner's burn rate (low, medium or high) during a cooking/heating operation.

During the initial configuration and training mode, the integrated adaptive auto learning system may automatically detect the start of the burner and also be able to interpret from the positions of the burner, the intensity of the cooking operation. In cooking appliances where it has electronic displays, the integrated adaptive auto learning system may either be able to use available APIs to integrate with the appliances to determine the state of the burner or use Computer vision capability to interpret the display and determine the intensity of the cooking operation.

Figure 7:
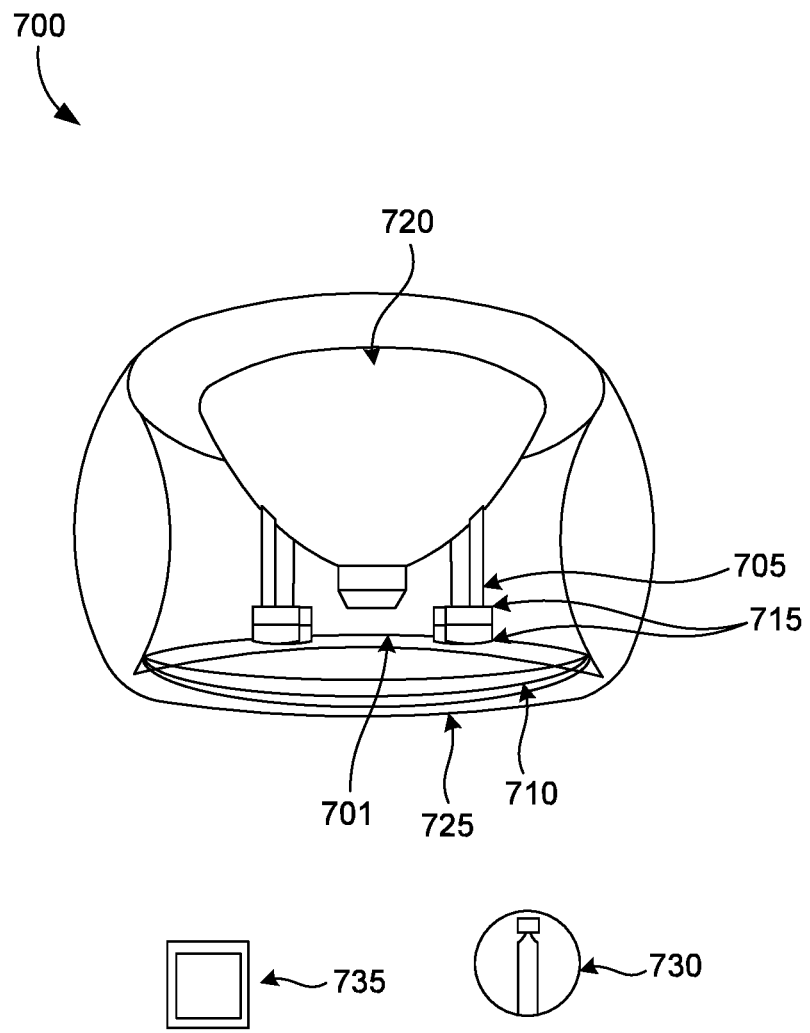
FIG. 7 illustrates an exemplary portion of an integrated adaptive auto learning system for cooking operations and pre-hazard monitoring in accordance with an embodiment of the present invention.

Referring to FIG. 7 is illustrated an exemplary portion 700 of an integrated adaptive auto learning system for cooking operations and pre-hazard monitoring in accordance with an embodiment of the present invention. Accordingly, FIG. 7 depicts a potential form and structure of the core components of the integrated adaptive auto learning system including but not limited to the external detachable cover assembly for the integrated adaptive auto learning system, audio and imaging receivers, mechanism to connect some of the components like magnets or screws, protective cover and the knob marker. For clarity, the form and structure of the components described in this FIG. 7 may vary and may be based on various parameters such as the type of image receiver (such as camera), shape of the encasement, whether the integrated adaptive auto learning system is placed under a hood, a microwave oven or as a separate overhanging attachment from the roof etc. In exemplary embodiments, the potential placement of sensors and imaging receiver (such as a motion detector and/or camera) is indicated at 701, the potential placement of one of the multiple shafts that may be used to hold up some of the core components (such as sensors and image receiver) of the integrated adaptive auto learning system is indicated at 705, a protective cover 710 may enclose the components of the integrated adaptive auto learning system, other than the external components such as weight sensor and knob marker; magnets and metal 715 integrated onto the shafts and protective glass cover and may be used to connect the shaft to the protective glass cover; a protective cover 720 for some core components of the integrated adaptive auto learning system such as the processor and storage; and detachable and washable heat resistant protective glass cover or enclosure with magnets 725. Such heat resistant protective glass cover or enclosure shields certain components of the integrated adaptive auto learning system, such as, the image receiver from environmental particles, cooking vapors, grease, and the like. In one embodiment, the detachable and washable heat resistant protective glass cover or enclosure may be dish washer friendly. A potential form and structure of the knob marker (a component of the System and Method) is shown by component 730. The knob marker is an attachment cap required for accurate interpretation, by the integrated adaptive auto learning system of the knob's position during the cooking/heating operation to determine burner's burn rate (low, medium or high). The integrated adaptive auto learning system may include any optional weight sensor component 735. The weight sensor may measure the weight of the utensil with the food such that the weight data can be stored, interpreted and used for learning and also for determining optimal cooking/heating time for various foods.

Figure 8:
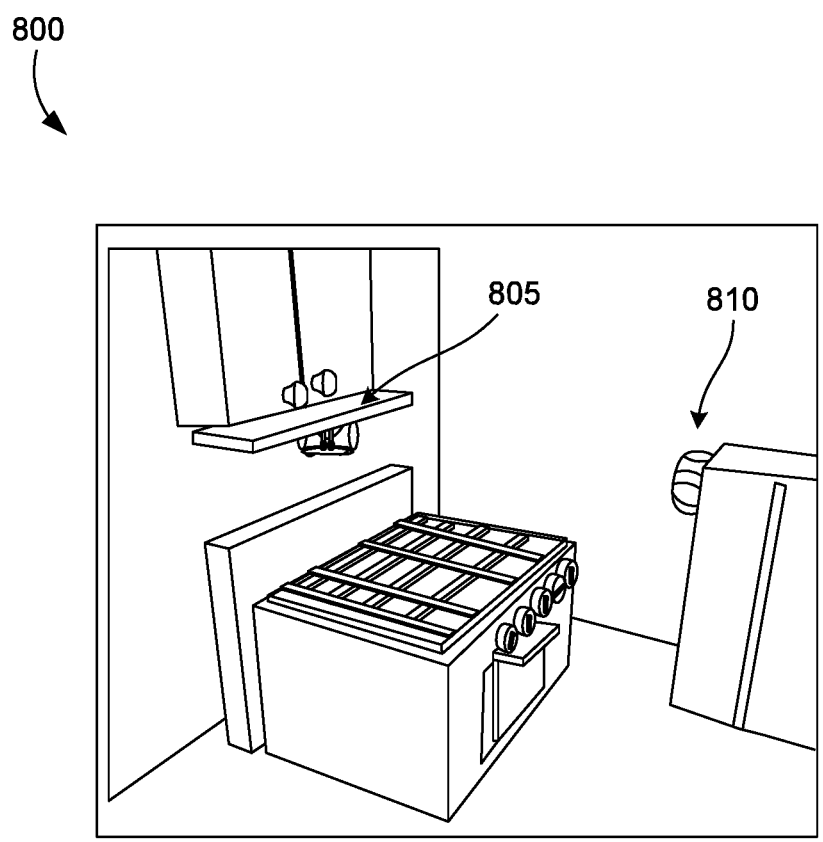
FIG. 8 illustrates an exemplary portion of an integrated adaptive auto learning system for cooking operations and pre-hazard monitoring in accordance with an embodiment of the present invention.

Referring to FIG. 8, is illustrated an exemplary portion 800 of an integrated adaptive auto learning system for cooking operations and pre-hazard monitoring in accordance with an embodiment of the present invention. Accordingly, FIG. 8 is an illustration of potential deployment in one of scenarios where multiple devices will be deployed in a kitchen environment. FIG. 8 depicts the combination of multiple devices/sensors placed in different locations in the kitchen environment in order to have complete visibility of the operations within the kitchen. A plurality of devices may be used to get audio and video information in real time in order to feed the signal into the integrated adaptive auto learning system. Position 805 indicates an exemplary manner in which the integrated adaptive auto learning system may be placed over the cooking appliance/range. Position 810 shows an alternative way that the integrated adaptive auto learning system may be placed. An equal or reduced functionality version of the integrated adaptive auto learning system may be attached in one or more locations within the kitchen environment to get frontal views of the appliance burner knobs and the actual kitchen flame situation from a different angle in order to get accurate view of the situation and also to determine the burner position.

It may be appreciated by a person with ordinary skill in the art, in light of and in accordance with the teachings of the present invention, that the sensorial input components of the integrated adaptive auto learning system may be placed in different areas of the kitchen to facilitate better view/data gathering/image recognition ang therefore get a more complete and comprehensive view of the cooking/heating operation and more accurate contextual information which may lead to better decision-making and optimal cooking operation and proactive non-optimal condition monitoring. In one embodiment, plural devices may have different components assembled within the enclosure to perform an aggregated function and to provide redundancy and backup mode for accurate sensorial input to the integrated adaptive auto learning system. For example, the second device for the integrated adaptive auto learning system may have only audio and video sensors while the device on top of the appliance may have additional sensors like heat, gas and other sensors. The local computing components may be housed in a hub device away from the kitchen environment to prevent any damage and to manage the heat and other environmental stress on the computing components.

Figure 9:
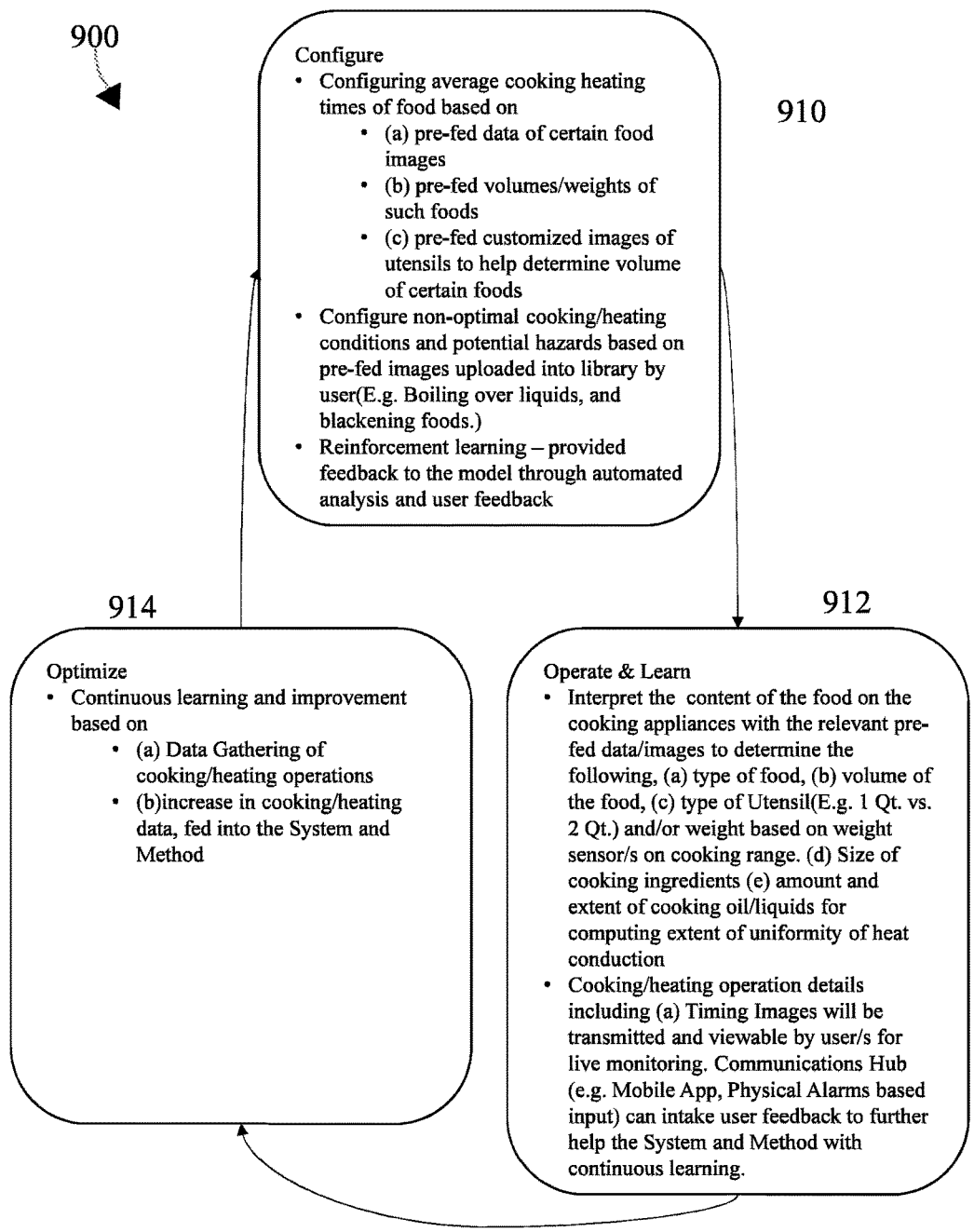
FIG. 9 illustrates a process of an integrated adaptive auto learning system for cooking operations and pre-hazard monitoring in accordance with an embodiment of the present invention.

Referring to FIG. 9 is illustrated a process 900 of an integrated adaptive auto learning system for cooking operations and pre-hazard monitoring in accordance with an embodiment of the present invention. In the exemplary embodiment shown in FIG. 9, the process may include three main steps that repeat in a circle to provide an adaptive continuous learning process for optimal cooking operations. The first step may include a configuring step 910. In this step the user may configure average cooking/heating times of food based on (a) pre-fed data of certain food images; (b) pre-fed volumes/weight of such foods; (c) pre-fed customized images of utensils to help determine volume of certain foods; and then configure non-optimal cooking/heating conditions and potential hazards based on pre-fed images uploaded into library by user (e.g., boiling over liquids, and blackening foods), followed by reinforcement learning that may include providing feedback to the models through automated analysis and user feedback. The second step may include an operate and learn step 912. In this step the system may interpret the content of the food on the cooking appliances with the relevant pre-fed data/images to determine the following, (a) type of food, (b) volume of food, (c) type of utensil (e.g., 1 Qt. vs. 2 Qt.) and/or weight based on weight sensor/s on cooking range, (d) size of cooking ingredients, (e) amount and extent of cooking oil/liquids for computing extent of uniformity of heat conduction, and the like. Further, cooking/heating operation details including (a) timing images may be transmitted and viewable by user/s for live monitoring and the communications hub (e.g. mobile application, physical alarms based input) may take user feedback to further help the system with continuous learning. In a third step 914 the system may be optimized with continuous learning and improvement based on (a) data gathering of cooking/heating operations, (b) increase in cooking/heating data fed into the system, and the like improvements. This cycle may continue to provide and improved an integrated adaptive auto learning system for cooking operations and pre-hazard monitoring in accordance with an embodiment of the present invention.

Figure 10:
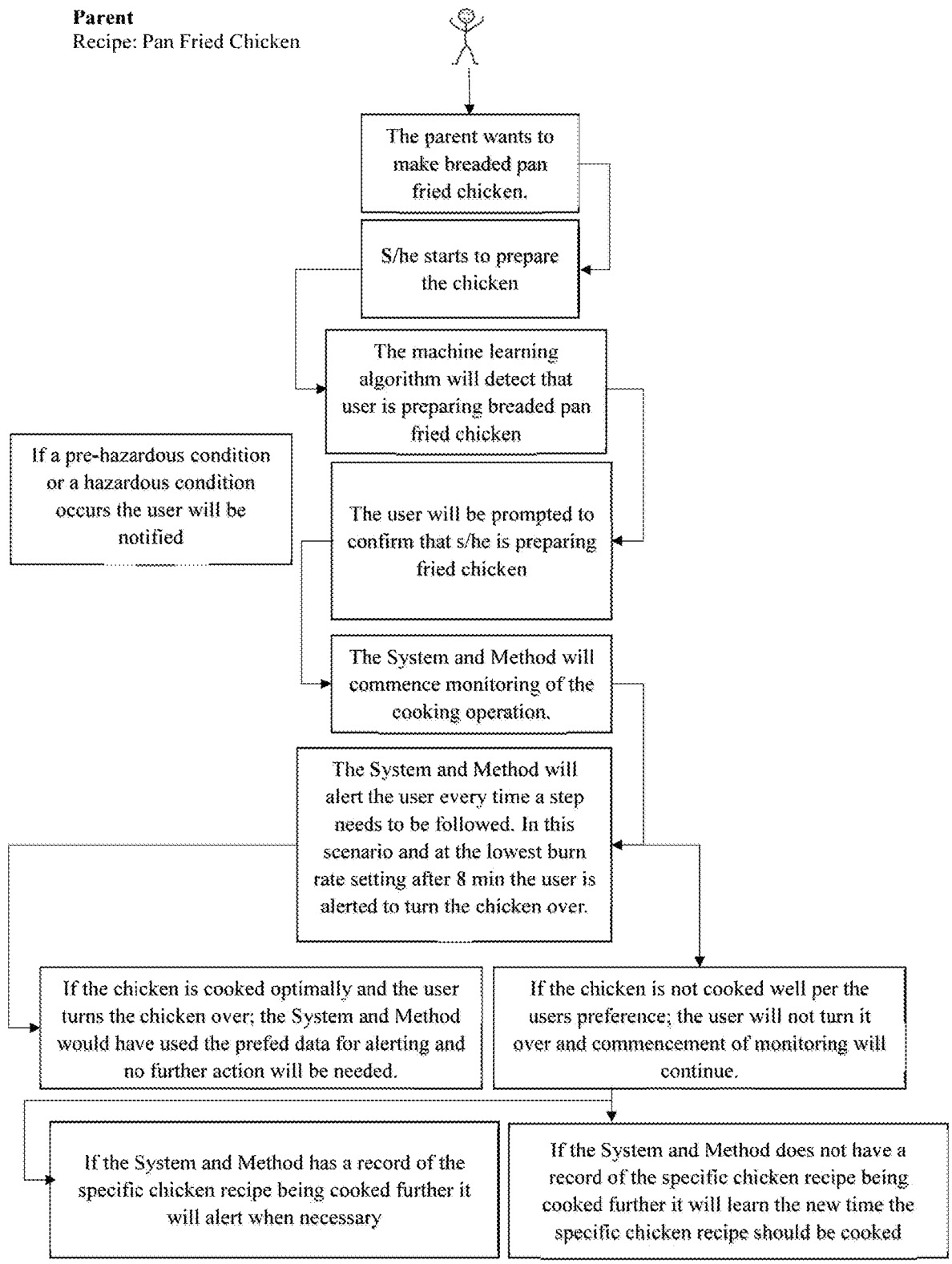
FIG. 10 illustrates a process of an integrated adaptive auto learning system for cooking operations and pre-hazard monitoring for a parent in accordance with an embodiment of the present invention.

In various embodiments the integrated adaptive auto learning system for cooking operations disclosed herein may notify the user at the user preferred right time through an innovative way of human and system interaction by understanding details about the contextual environment. In an exemplary embodiment as described with reference to FIG. 10 where a multi-tasking or a working parent may be attempting to get some cooking done. The parent may have multiple distractions like activities with children, cooking multiple things on stove, may forget to switch of stove, among other complications. The integrated adaptive auto learning system for cooking operations disclosed herein has the capability to comprehend if the food on the range is being cooked based on the optimal setting for the family and will notify the parent to take the next step in the process of cooking. Example: turn the breaded chicken breast pieces over to the other side, or notifies (at different required times) the parent who is helping the kids with their homework and piano practice etc. that rice is cooked, to flip over the breaded chicken breast pieces and the optimal preferred time for mixed vegetable sauté with sriracha sauce is complete. The system disclosed herein may also come equipped with multiple sensors (e.g. a camera, heat and gas sensors) that can process if the burners on the stove are still on, and if they are still on with nothing being cooked at the time the user will be alerted as a part of pre-hazardous/non-optimal situation notification.

Figure 11:
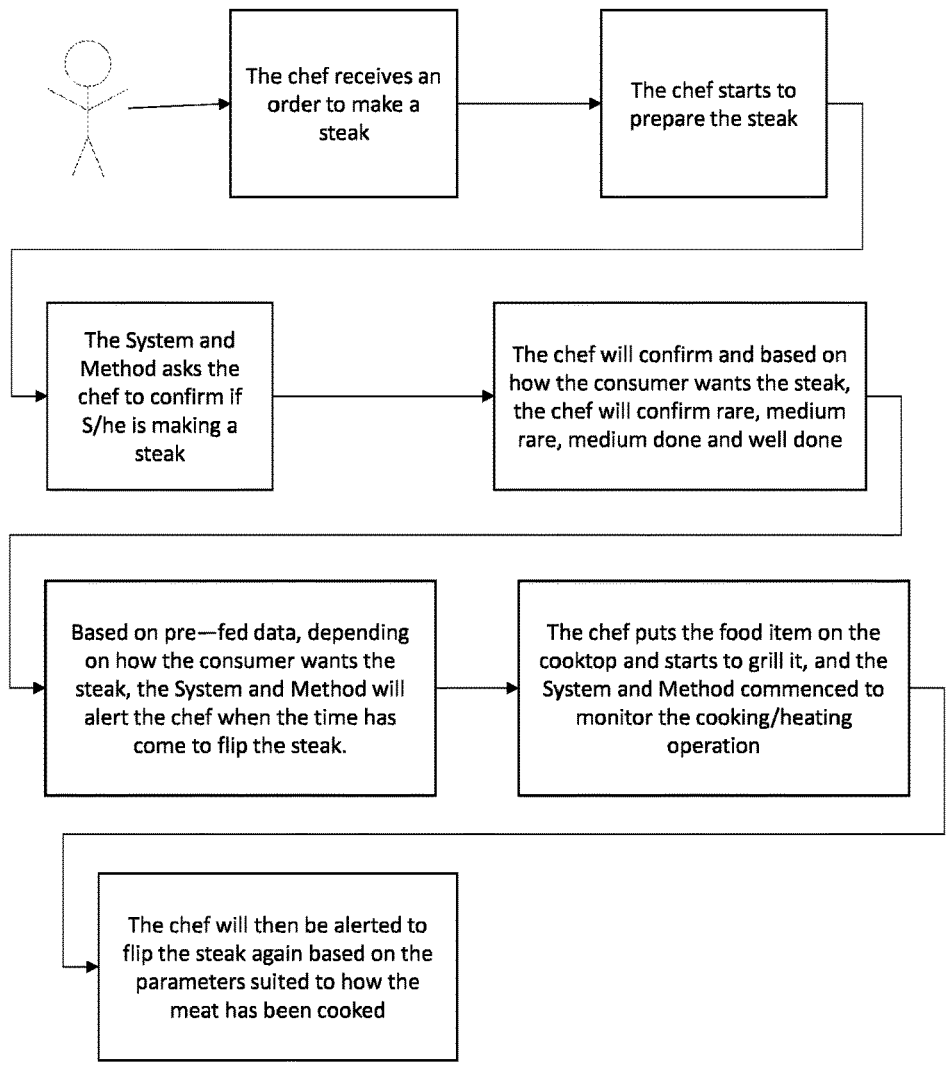
FIG. 11 illustrates a process of an integrated adaptive auto learning system for cooking operations and pre-hazard monitoring for a chef in accordance with an embodiment of the present invention.

In an exemplary embodiment as described with reference to FIG. 11 where a chef is tasked with ensuring optimal cooking for different users wanting the same item to be cooked differently, in accordance with embodiments of the present invention. The system disclosed herein may enable chefs to get trained faster to perform complex cooking operations in multi-cuisine restaurants. As mentioned hereinabove, the system disclosed herein may have the capability to notify the chef who is cooking pan seared beef steak for multiple people having multiple preferences (in multiple burners) such as rare, medium rare, medium and well cooked. The alert sent for each user will alert the chef to turn over the beef steaks at different times for different users. Other than increasing the popularity of the restaurant and customer satisfaction due to creation of optimally cooked food every time; the system may prevent non-hazardous conditions as well as wastage of food due to non-optimal cooking.

Figure 12:
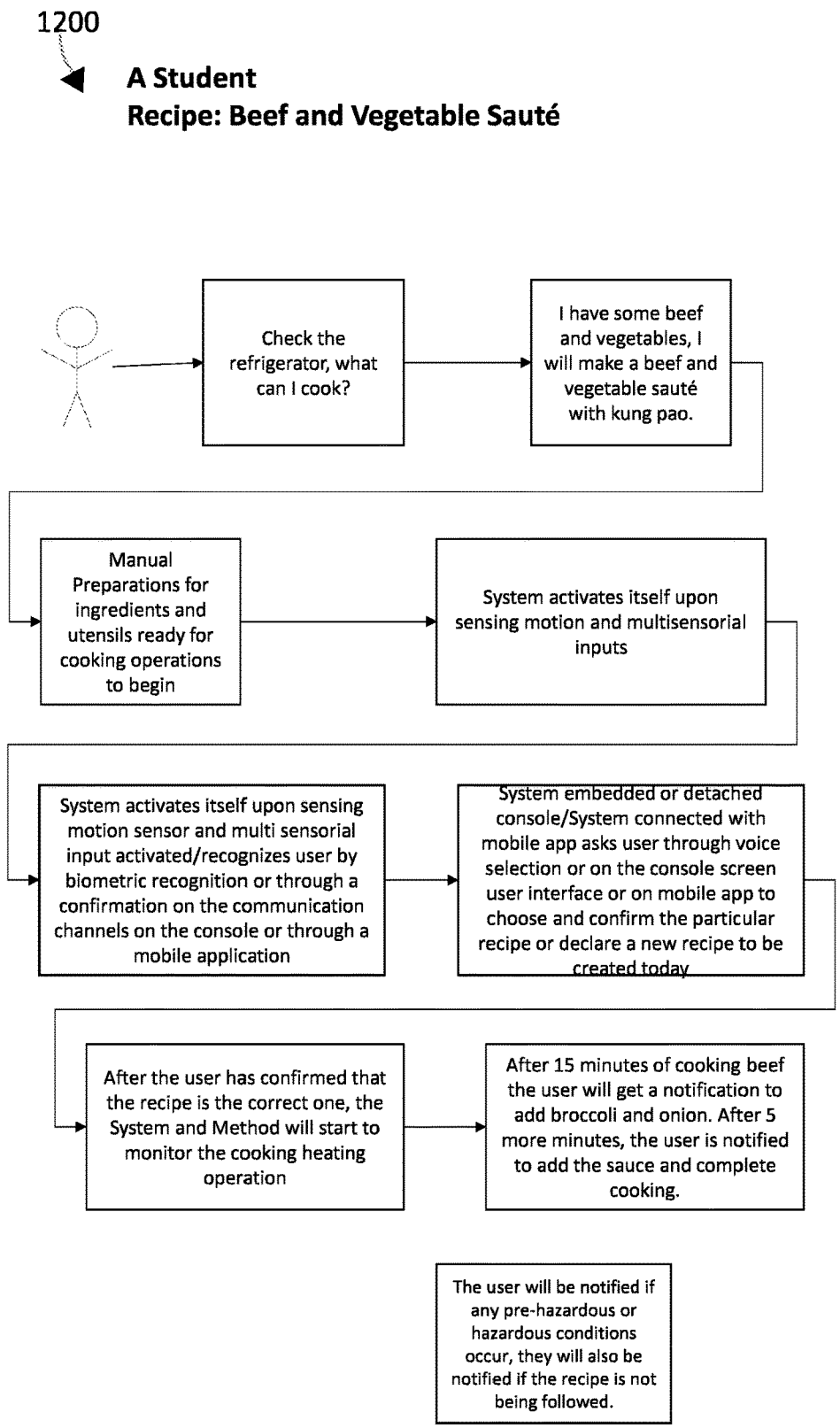
FIG. 12 illustrates a process of an integrated adaptive auto learning system for cooking operations and pre-hazard monitoring for a student in accordance with an embodiment of the present invention.

In an exemplary embodiment as described with reference to FIG. 12 where a student is tasked with multitasking with cooking among various other responsibilities with tremendous constraint in terms of the total time available in his/her schedule to manage both the personal and professional calendar. Furthermore, s/he may have limited cooking appliances and vessels. The system disclosed herein may allow a user to leave the kitchen unattended. The user may freely do what he or she likes while the system disclosed herein may monitor the cooking heating operation. For example, if the student wants to cook stove top one pot chicken cacciatore, student would put the ingredients including chicken, vegetables, wine, broth, tomato paste etc.), and put the burner in a low burn-rate position, take an online academic class, and be notified about the completion of the optimal cooking operation in about 50 minutes.

In certain exemplary situations students may want to eat food that would require attention at different times during the cooking process but has challenges in terms of dedicated time at the cooking area. The student may make more complex dishes to their liking, because during the cooking/heating stage the user can let the system monitor the cooking. In the chicken cacciatore recipe that is based on the pre-fed user preferred stored data; the system may notify the student in about 40 minutes to add in olives and then again after 10 more minutes that the dish is now done.

Figure 13:
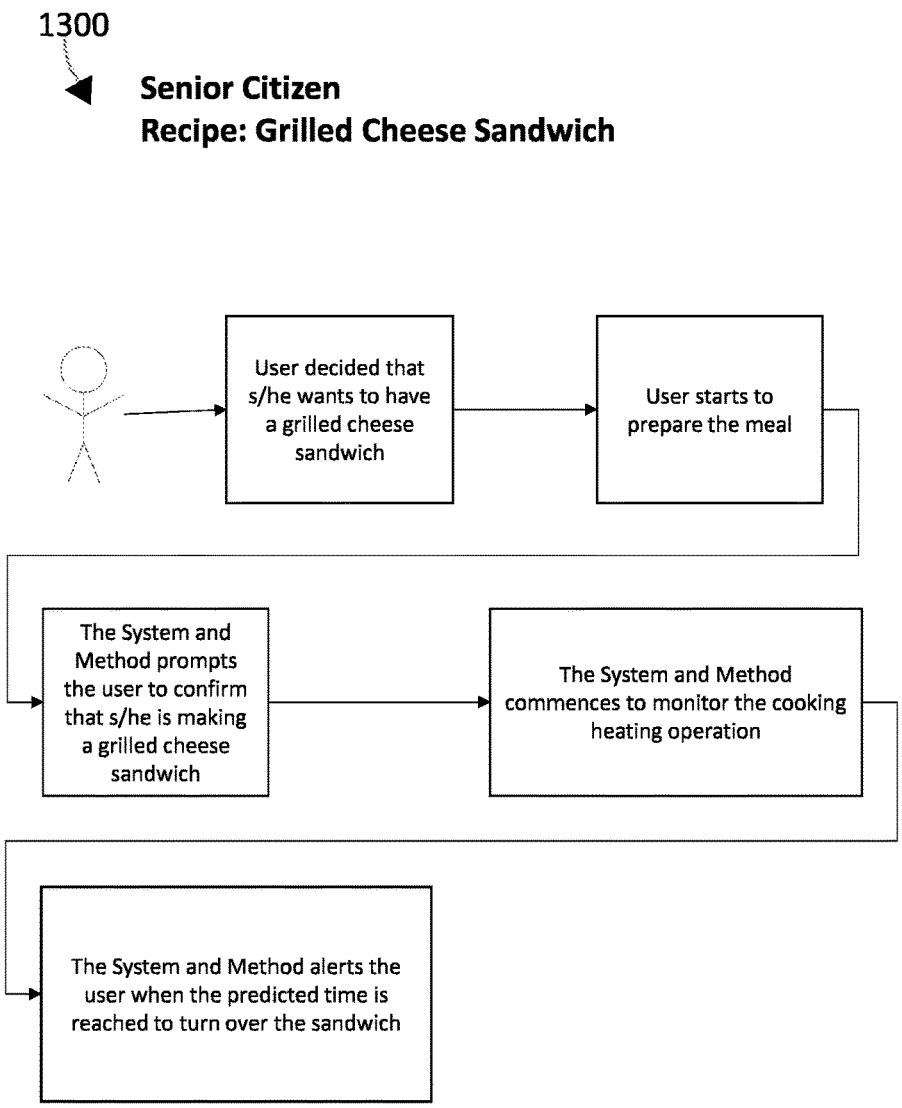
FIG. 13 illustrates a process of an integrated adaptive auto learning system for cooking operations and pre-hazard monitoring for the elderly in accordance with an embodiment of the present invention.

In an exemplary embodiment as described with reference to FIG. 13 where the elderly population with limited capability to remember things are tasked with cooking the system disclosed herein may alert the user that they have something cooking, and the user can get back to the next step in the cooking/heating process. This will allow elderly population to be independent for long time while keeping them away from hazardous conditions. It may also allow them to enjoy different foods of their liking without having to worry about forgetting about the cooking/heating operation. As mentioned herein above the system may also detect hazardous and pre-hazardous kitchen environments and alert the user.

Figure 14:
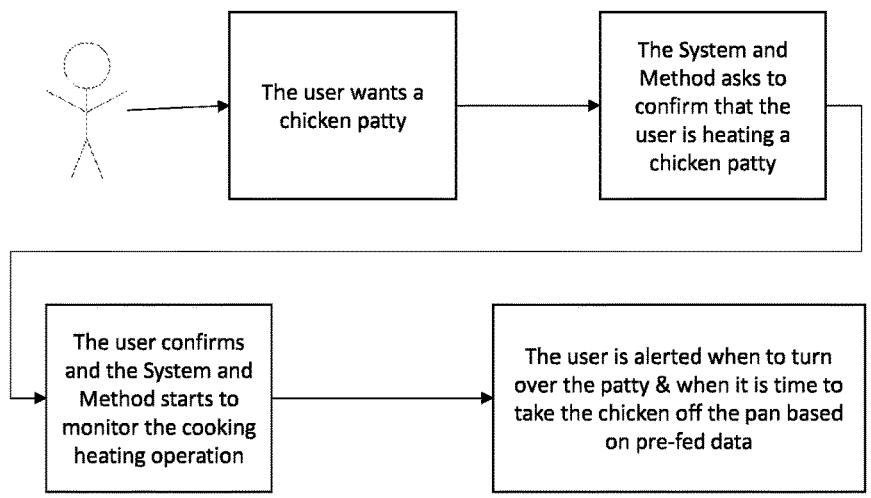
FIG. 14 illustrates a process of an integrated adaptive auto learning system for cooking operations and pre-hazard monitoring for new cooks in accordance with an embodiment of the present invention.

In an exemplary embodiment as described with reference to FIG. 14 where a new cook may be tasked cooking, the user may start to initiate the cooking operation. An average preteen may be occupied by many parallel activities and hence has a shorter attention span possibly causing them to forget that there is food being cooked on the stove. They also like to do multiple things as a time like doing their homework, practicing their piano, browsing the internet, watching a movie, playing a game etc. and can forget about the food on the stove. This may lead to non-optimally cooked food or hazardous conditions. The system may help prevent or minimize such occurrence with new cooks. Also, sometimes after the user completes the cooking heating operation, they sometimes forget that the stove is on. As mentioned hereinbefore the system disclosed herein may have the capability to alert the user if no cooking heating operation is underway but the knob/burner is inadvertently left on.

Turning back to FIG. 1, the systems at least one computing device 125 and at least a storage device 150. The computing device 125 may be in working communication with computer devices 140 via communication hub 130. The computer device 125, 140, may include a display screen, a database, and a miscellaneous data input interface (not shown in figures). It may be appreciated by a person with ordinary skill in the art, in light of and in accordance with the teachings of the present invention, that the computer devices have been numbered for brevity. Each system disclosed herein may have a computer device and the users may have their personal devices in working communication with the system computer device 125.

As described with reference to FIG. 3 and FIG. 4 above the computing device 125 may receive information form sensors 115 and from user input devices 140, 145 via the communication hub 130. The computing device 125 may then use information provided by the user and pre-stored information from the cloud storage 150 to ensure a smooth cooking operation for the user with required reminders and alerts being provided to the user as mentioned hereinabove.

It may be appreciated by a person with ordinary skill in the art, in light of and in accordance with the teachings of the present invention, that the computing device 125, and the user input device 140 may include virtually any computer device capable of capturing, processing, and displaying user information and providing appropriate information and assistance to the communication hub for delivering to the computer device 125. Non-limiting examples of the computing systems and computers include a computer, a smart phone, an appliance, sensors, etc. The computing systems and the computer devices may include any computing platform that executes computer software and/or code from a non-transitory computer readable medium. The computing systems and the computer devices may include a single device or multiple devices. In embodiments where the computing system and the computer device is a single device all the functions of capturing the user information including user data, visual data, vocal data, environmental data, etc. may be executed by the single computing system and/or the computer device. In embodiments where the computing system and the computer device include multiple devices these functions may be distributed between the multiple devices. For example, the gathering of visual data may be done by one computer device and the gathering of vocal data and physical attributes data may be done by another computer device. In another embodiment, the computer device is a single device and the computer system is a single computer system.

It may be appreciated by a person with ordinary skill in the art, in light of and in accordance with the teachings of the present invention, that the computing device 125 may connect to any number of devices with virtually any wired and/or wireless means. The computing system may connect to virtually any device by means such as, but not limited to, Bluetooth connection, Ethernet cable, USB cable, WIFI, IRDA, etc. . . . In one embodiment, the computing device 125 may connect to other devices for gathering user information and delivery information.

It may be appreciated by a person with ordinary skill in the art, in light of and in accordance with the teachings of the present invention, that a miscellaneous data input interface may be virtually any data input interface capable of capturing information from the user input device 140 or other user input device 145. The computing system may include tools, for example, alarm recognition, using the miscellaneous data input interface. The tools may be capable of gathering information on the user's preferences and the output that is to be delivered. Non-limiting variables of user's preferences include type of food, level of cooking, etc. . . .

The database may be, but not limited to, a plurality of data servers, and a memory card. In certain embodiments, the cloud computing system 150 may function as the database. It may be appreciated by a person with ordinary skill in the art, in light of and in accordance with the teachings of the present invention, that the database (containing user's organized information) may contain virtually any user data to enable the computing device 125 to provide cooking assistance to the user.

It may be appreciated by a person with ordinary skill in the art, in light of and in accordance with the teachings of the present invention, the user information gathered may partially or completely be contained in a local computing platform and/or network. In an alternative embodiment of the present invention, the user information gathered may be located on a local computer network.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied. Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

Figure 15:
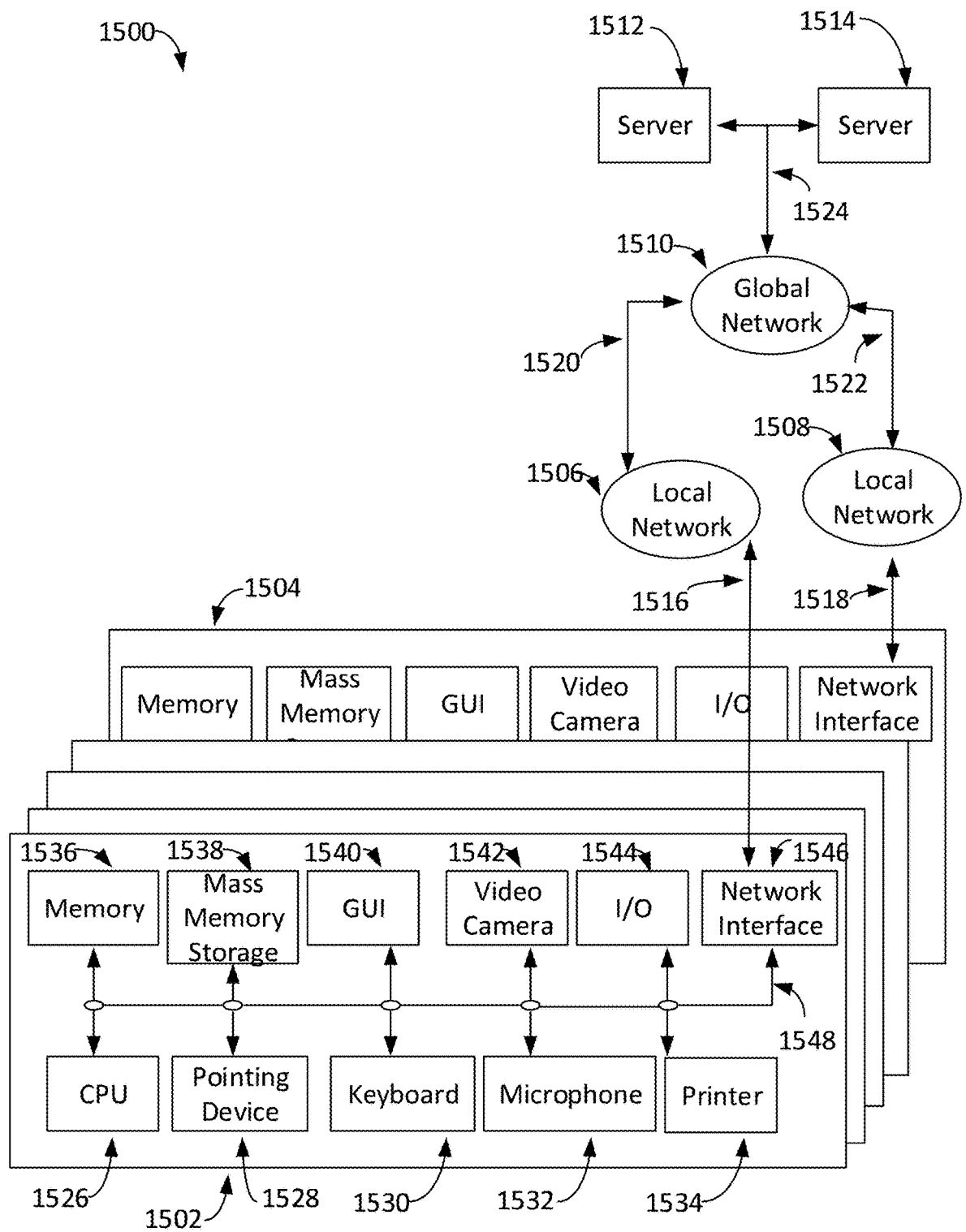
FIG. 15 is a block diagram depicting an exemplary client/server system which may be used by an exemplary web-enabled/networked embodiment of the present invention.

FIG. 15 is a block diagram depicting an exemplary client/server system which may be used by an exemplary web-enabled/networked embodiment of the present invention.

A communication system 1500 includes a multiplicity of clients with a sampling of clients denoted as a client 1502 and a client 1504, a multiplicity of local networks with a sampling of networks denoted as a local network 1506 and a local network 1508, a global network 1510 and a multiplicity of servers with a sampling of servers denoted as a server 1512 and a server 1514.

Client 1502 may communicate bi-directionally with local network 1506 via a communication channel 1516. Client 1504 may communicate bi-directionally with local network 1508 via a communication channel 1518. Local network 1506 may communicate bi-directionally with global network 1510 via a communication channel 1520. Local network 1508 may communicate bi-directionally with global network 1510 via a communication channel 1522. Global network 1510 may communicate bi-directionally with server 1512 and server 1514 via a communication channel 1524. Server 1512 and server 1514 may communicate bi-directionally with each other via communication channel 1524. Furthermore, clients 1502, 1504, local networks 1506, 1508, global network 1510 and servers 1512, 1514 may each communicate bi-directionally with each other.

In one embodiment, global network 1510 may operate as the Internet. It will be understood by those skilled in the art that communication system 1500 may take many different forms. Non-limiting examples of forms for communication system 1500 include local area networks (LANs), wide area networks (WANs), wired telephone networks, wireless networks, or any other network supporting data communication between respective entities.

Clients 1502 and 1504 may take many different forms. Non-limiting examples of clients 1502 and 1504 include personal computers, personal digital assistants (PDAs), cellular phones and smartphones.

Client 1502 includes a CPU 1526, a pointing device 1528, a keyboard 1530, a microphone 1532, a printer 1534, a memory 1536, a mass memory storage 1538, a GUI 1540, a video camera 1542, an input/output interface 1544, and a network interface 1546.

CPU 1526, pointing device 1528, keyboard 1530, microphone 1532, printer 1534, memory 1536, mass memory storage 1538, GUI 1540, video camera 1542, input/output interface 1544 and network interface 1546 may communicate in a unidirectional manner or a bi-directional manner with each other via a communication channel 1548. Communication channel 1548 may be configured as a single communication channel or a multiplicity of communication channels.

CPU 1526 may be comprised of a single processor or multiple processors. CPU 1526 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general-purpose microprocessors.

As is well known in the art, memory 1536 is used typically to transfer data and instructions to CPU 1526 in a bi-directional manner. Memory 1536, as discussed previously, may include any suitable computer-readable media, intended for data storage, such as those described above excluding any wired or wireless transmissions unless specifically noted. Mass memory storage 1538 may also be coupled bi-directionally to CPU 1526 and provides additional data storage capacity and may include any of the computer-readable media described above. Mass memory storage 1538 may be used to store programs, data and the like and is typically a secondary storage medium such as a hard disk. It will be appreciated that the information retained within mass memory storage 1538, may, in appropriate cases, be incorporated in standard fashion as part of memory 1536 as virtual memory.

CPU 1526 may be coupled to GUI 1540. GUI 1540 enables a user to view the operation of computer operating system and software. CPU 1526 may be coupled to pointing device 1528. Non-limiting examples of pointing device 1528 include computer mouse, trackball and touchpad. Pointing device 1528 enables a user with the capability to maneuver a computer cursor about the viewing area of GUI 1540 and select areas or features in the viewing area of GUI 1540. CPU 1526 may be coupled to keyboard 1530. Keyboard 1530 enables a user with the capability to input alphanumeric textual information to CPU 1526. CPU 1526 may be coupled to microphone 1532. Microphone 1532 enables audio produced by a user to be recorded, processed and communicated by CPU 1526. CPU 1526 may be connected to printer 1534. Printer 1534 enables a user with the capability to print information to a sheet of paper. CPU 1526 may be connected to video camera 1542. Video camera 1042 enables video produced or captured by user to be recorded, processed and communicated by CPU 1026.

CPU 1026 may also be coupled to input/output interface 1044 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1526 optionally may be coupled to network interface 1546 which enables communication with an external device such as a database or a computer or telecommunications or internet network using an external connection shown generally as communication channel 1516, which may be implemented as a hardwired or wireless communications link using suitable conventional technologies. With such a connection, CPU 1526 might receive information from the network, or might output information to a network in the course of performing the method steps described in the teachings of the present invention.

Figure 16:
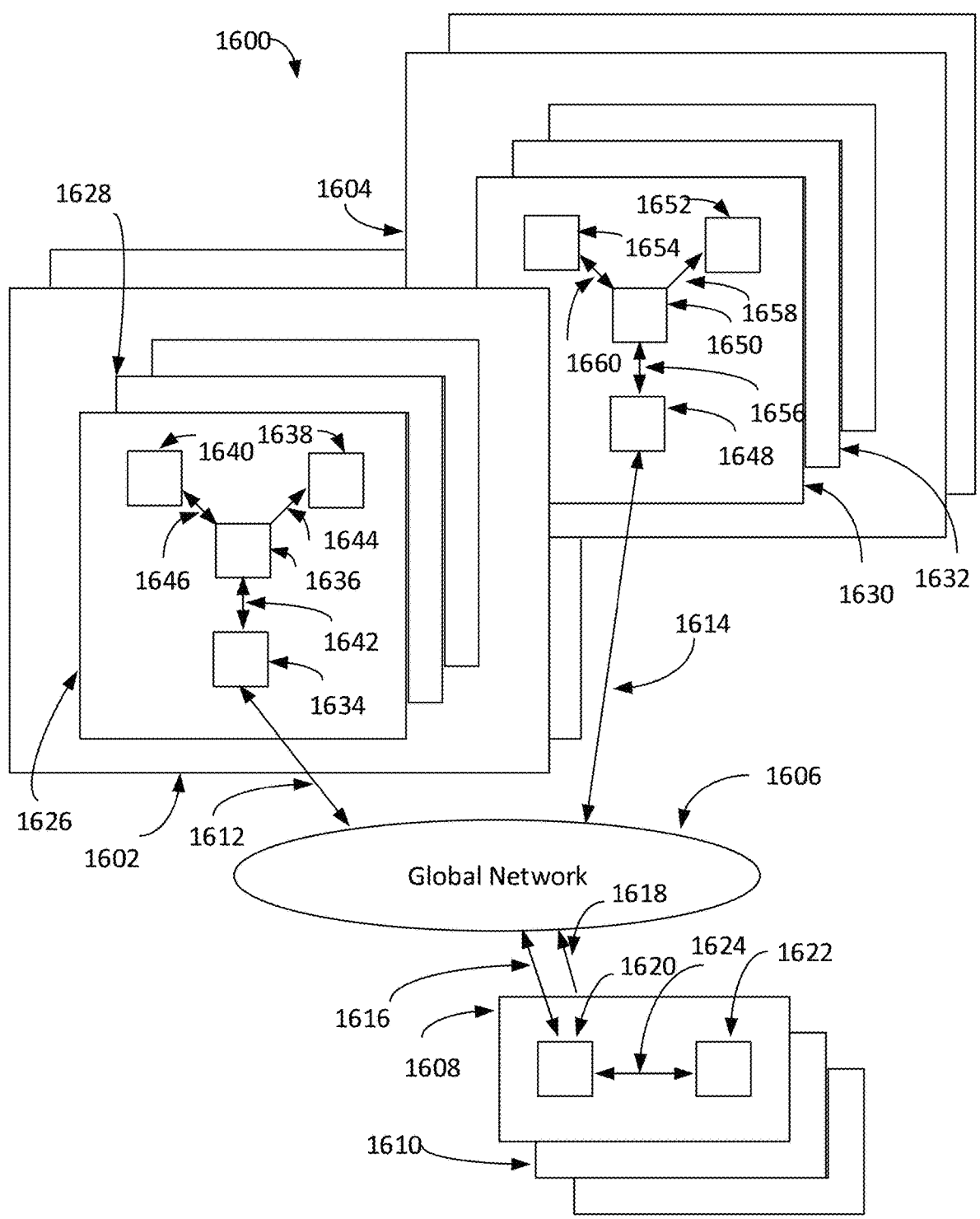
FIG. 16 illustrates a block diagram depicting a conventional client/server communication system.

FIG. 16 illustrates a block diagram depicting a conventional client/server communication system.

A communication system 1600 includes a multiplicity of networked regions with a sampling of regions denoted as a network region 1602 and a network region 1604, a global network 1606 and a multiplicity of servers with a sampling of servers denoted as a server device 1608 and a server device 1610.

Network region 1602 and network region 1604 may operate to represent a network contained within a geographical area or region. Non-limiting examples of representations for the geographical areas for the networked regions may include postal zip codes, telephone area codes, states, counties, cities and countries. Elements within network region 1602 and 1604 may operate to communicate with external elements within other networked regions or within elements contained within the same network region.

In some implementations, global network 1606 may operate as the Internet. It will be understood by those skilled in the art that communication system 1600 may take many different forms. Non-limiting examples of forms for communication system 1600 include local area networks (LANs), wide area networks (WANs), wired telephone networks, cellular telephone networks or any other network supporting data communication between respective entities via hardwired or wireless communication networks. Global network 1606 may operate to transfer information between the various networked elements.

Server device 1608 and server device 1610 may operate to execute software instructions, store information, support database operations and communicate with other networked elements. Non-limiting examples of software and scripting languages which may be executed on server device 1608 and server device 1610 include C, C++, C# and Java.

Network region 1602 may operate to communicate bi-directionally with global network 1606 via a communication channel 1612. Network region 1604 may operate to communicate bi-directionally with global network 1606 via a communication channel 1614. Server device 1608 may operate to communicate bi-directionally with global network 1606 via a communication channel 1616. Server device 1610 may operate to communicate bi-directionally with global network 1606 via a communication channel 1618. Network region 1602 and 1604, global network 1606 and server devices 1608 and 1610 may operate to communicate with each other and with every other networked device located within communication system 1600.

Server device 1608 includes a networking device 1620 and a server 1622. Networking device 1620 may operate to communicate bi-directionally with global network 1606 via communication channel 1616 and with server 1622 via a communication channel 1624. Server 1622 may operate to execute software instructions and store information.

Network region 1602 includes a multiplicity of clients with a sampling denoted as a client 1626 and a client 1628. Client 1626 includes a networking device 1634, a processor 1636, a GUI 1638 and an interface device 1640. Non-limiting examples of devices for GUI 1638 include monitors, televisions, cellular telephones, smartphones and PDAs (Personal Digital Assistants). Non-limiting examples of interface device 1640 include pointing device, mouse, trackball, scanner and printer. Networking device 1634 may communicate bi-directionally with global network 1606 via communication channel 1612 and with processor 1636 via a communication channel 1642. GUI 1638 may receive information from processor 1636 via a communication channel 1644 for presentation to a user for viewing. Interface device 1640 may operate to send control information to processor 1636 and to receive information from processor 1636 via a communication channel 1646. Network region 1604 includes a multiplicity of clients with a sampling denoted as a client 1630 and a client 1632. Client 1630 includes a networking device 1648, a processor 1650, a GUI 1652 and an interface device 1654. Non-limiting examples of devices for GUI 1638 include monitors, televisions, cellular telephones, smartphones and PDAs (Personal Digital Assistants). Non-limiting examples of interface device 1640 include pointing devices, mousse, trackballs, scanners and printers. Networking device 1648 may communicate bi-directionally with global network 1606 via communication channel 1614 and with processor 1650 via a communication channel 1656. GUI 1652 may receive information from processor 1650 via a communication channel 1658 for presentation to a user for viewing. Interface device 1654 may operate to send control information to processor 1650 and to receive information from processor 1650 via a communication channel 1660.

For example, consider the case where a user interfacing with client 1626 may want to execute a networked application. A user may enter the IP (Internet Protocol) address for the networked application using interface device 1640. The IP address information may be communicated to processor 1636 via communication channel 1646. Processor 1636 may then communicate the IP address information to networking device 1634 via communication channel 1642. Networking device 1634 may then communicate the IP address information to global network 1606 via communication channel 1612. Global network 1606 may then communicate the IP address information to networking device 1620 of server device 1608 via communication channel 1616. Networking device 1620 may then communicate the IP address information to server 1622 via communication channel 1624. Server 1622 may receive the IP address information and after processing the IP address information may communicate return information to networking device 1620 via communication channel 1624. Networking device 1620 may communicate the return information to global network 1606 via communication channel 1616. Global network 1606 may communicate the return information to networking device 1634 via communication channel 1612. Networking device 1634 may communicate the return information to processor 1636 via communication channel 1642. Processor 1646 may communicate the return information to GUI 1638 via communication channel 1644. User may then view the return information on GUI 1638.

Accordingly, the system and method disclosed herein in various embodiments include the following features (i) ability to sense and interpret ingredients and utensils—guesstimate weight, type, etc. through a plurality of sensors such as computer image recognition, audio sensors and/or weight sensors; (ii) ability to determine the state of cooking based on image recognition; (iii) ability to update recipe database in real time through recipe import from multiple channels, either shared user groups or through web import; (iv) store data pertaining to description of pre-hazardous cooking/heating conditions or configured non-optimal conditions; (v) transforming the said sensed attributes and parameters into computer readable commands; (vi) may have the ability to override said configured sequence of triggers/alerts (to immediately execute triggers/alert) if pre-configured pre-hazardous cooking/heating conditions or configured non-optimal conditions is reached or sensed; (vii) execute triggers/alerts when pre-configured pre-hazardous cooking/heating conditions or configured non-optimal conditions is reached or sensed; and (viii) initiates performance of cooking/heating monitoring and learning operations by training upon data received from singular or plurality of sensors and from data stored.

In one embodiment, the system may include a single or plurality of sensors (installed at one or multiple locations within the kitchen environment). The sensors may include components like audio visual alert including but not limited to a buzzer or light emitting diode, heat resistant imaging sensor, audio sensor, motion sensor, a sensor to measure concentration of cooking gas or vapor in the environment around the sensors, heat sensor to measure temperature gradient in the immediate vicinity of the device, an external weight sensor attached to the burners, a computing device with a processor and memory with ability to connect wirelessly to external computing and storage capabilities, optional capability to integrate with the cloud for computing and storage, circuit integration components for connecting all the components, a knob enclosure with markers to depict the burn rate, power source within the housing (which may operate with batteries or being directly connected to the electrical source), algorithms within the computing device or/and the cloud to analyze and store information about cooking/heating operations, software application programming interface or API which can connect with specific cooking appliances or with other digital assistants or security systems or public emergency services or telecommunications as is technologically feasible.

Circuit integration components, software, pre-fed training data and continuous operations data may be used to calibrate, sense, detect and/or trigger communications, alerts and/or alarms. The values that are programmed are "< than alert trigger value" and "=/> than alert trigger value". The trigger values are configured and changed using a software console that can be accessed from multiple devices. Such trigger values can be based on a) pre-fed data pertaining to optimal cooking/heating of various foods b) interpretation by system and method disclosed herein for optimal cooking based on prior learning and gathered data c) Sensing of certain potential hazardous conditions including but not limited to blackening of food, smoke, boiling over of liquids, heat in excess of expected pre-fed values (e.g. temperature differential), and the like.

In embodiments, where the trigger value is reached and/or exceeded (i.e. "=/> than alert trigger value") the system and method, based on such data received, will trigger the communication, alert and/or alarms to activate (example activation of the buzzer or LED on the system and method, connect using Wi-Fi or cellular network or a mesh network to send a push notification to mobile/web applications, connect to a system to send an automated email or SMS Text or call a designated number).

The "integrated adaptive auto learning system for cooking operations and pre-hazard monitoring system and method" may at times be herein referred to as "system" or :system and method" It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6). In some embodiments, the methods and/or system components which may be located and/or performed remotely include, without limitation the process of automatic recognition of ingredients and association with closest match in terms of recipes based on the performance of the algorithms and the entire analysis of the performance can be done through machine learning. However additional user intervention may be required to provide feedback in terms of accuracy and resulting in improvement in the algorithms for future usage where the user can intervene and choose recipes based on a suggested list of options, in terms of providing closest match and also closest associated set of steps is going to be provide more enriched use that experience in times of simplicity and usage. Such data analysis pertaining to additional user intervention can be offshored.

It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breathe life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing an integrated adaptive auto learning system for cooking operations and pre-hazard monitoring system and method according to the present invention will be apparent to those skilled in the art. Various aspects of the invention have been described above by way of illustration, and the specific embodiments disclosed are not intended to limit the invention to the particular forms disclosed. The particular implementation of the integrated adaptive auto learning system for cooking operations and pre-hazard monitoring system and method may vary depending upon the particular context or application. By way of example, and not limitation, the integrated adaptive auto learning system for cooking operations and pre-hazard monitoring system and method described in the foregoing were principally directed to cooking operations implementations; however, similar techniques may instead be applied to, a system and method configured for use by differently abled individuals or seniors and elderly individuals, primarily because of the following reasons: (1) it will help reduce the amount of time and attention that the user need to provide to the cooking operation thus reducing the time the user has to stand in the kitchen environment (2) It will provide adequate alerts with notice is a very helpful feature (3) It will help reduce stress around cooking operations (4) the alerts can help prevent pre-hazardous and hazardous conditions (5) the system and method can be configured to send alerts simultaneously to an alternative friend, caregiver or family member of the user to ensure timely action in the cooking operation and to ensure the safety of the user and (6) the system and method can be configured to send either visual or sound alerts or both depending on the actual requirement of the user. which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

What is claimed is:

1. A method comprising:
   configuring an attribute data describing a cooking or heating time and a weight or volume for a predetermined food or recipe;
   storing said attribute data describing said cooking or heating time and weight or volume for said predetermined food or recipe;
   configuring a parameter data describing an environment of said cooking or heating for said predetermined food or recipe;
   storing said parameter data describing said environment of said cooking or heating for said predetermined food or recipe, in which said parameter data includes at least one of a predetermined temperature sensor reading, a temperature gradient, a gas sensor reading, a light sensor reading, a humidity sensor reading, a motion sensor reading, and a weight sensor reading;
   configuring a sequence of trigger or alert notification, said sequence of trigger or alert notification including at least one of notifying, a normal cooking or heating condition, a pre-hazardous cooking or heating condition, and a non-optimal cooking or heating condition for said predetermined food or recipe;
   storing said sequence of trigger or alert describing said normal cooking or heating condition, pre-hazardous cooking or heating condition, and non-optimal cooking or heating condition, wherein said condition data further includes an image of at least one of, cooked food, liquid boiling over, and blackened or charred food;
   sensing an initiation of a cooking or heating operation, in which said initiation of cooking or heating operation includes at least one of, detecting a clicking sound or lighter switching on operation from a cooking appliance, detecting a change in temperature, detecting a presence of gas, detecting a motion around an area of coverage by said cooking appliance, detecting a selection or tagging of said food or recipe;
   sensing at least one of an attribute and parameter involved in said cooking or heating operation based on said temperature sensor, temperature gradient, gas sensor, light sensor, humidity sensor, motion sensor, or weight sensor;
   transforming said at least one of said initiation of cooking or heating operation, sensed attribute, and sensed parameter into a computer readable command;
   mapping or comparing at least one of said initiation of said initiation of cooking or heating operation, sensed attribute, and sensed parameter with said stored attribute data, parameter data, and sequence of trigger or alert to find a match or a lack thereof;
   executing said trigger or alert when said configured normal cooking or heating condition is reached;
   overriding said configured sequence of triggers or alerts to immediately execute said trigger or alert if said pre-hazardous cooking or heating condition or configured non-optimal condition is reached;
   connecting with at least one of, a smart device and a smart assistant for a user interface and a user communication functionality; and
   communicating or interacting with said at least one of, smart device and smart assistant for storing new data or for alerting and notification purposes.

2. The method of claim 1, further comprising the steps of configuring attribute data pertaining to optimal cooking or heating sequences, timed triggers, or timed alerts for different foods or recipes and pre-hazardous conditions.

3. The method of claim 1, further comprising the steps of: enabling updates to said stored attribute data to include a description of cooking or heating times for different foods or recipes and a description of pre-hazardous cooking/heating conditions or configured non-optimal conditions for the different foods or recipes by enabling a retrieval of said stored attribute data to update the attribute of the data for fine tuning based on user preferences.

4. The method of claim 1, further comprising the steps of sensing said initiation of the cooking or heating operation by implementing single or plurality of sensors including one or more motion sensors to sense motion in a kitchen environment, imaging data received from a kitchen appliance, and detecting a position of a burner knob setting through an imaging receiver.

5. The method of claim 1, further comprising the steps of sensing of pre-configured pre-hazardous cooking or heating conditions or configured non-optimal conditions by implementing single or plurality of sensors including one or more sensors that are configured to detect gas leakage, a concentration of vapors beyond trigger value, a burner switched on without any actual cooking operation beyond a trigger value pertaining to time that a burner can be on without any actual cooking operation or pre-configured pre-hazardous cooking or heating condition or configured non-optimal conditions including but not limited to overflowing liquids, browning or burning of food.

6. The method of claim 1, further comprising the steps of executing said trigger or alert sequentially based on matched commands by communicating through embedded alarm system or multiple channel smart device.

7. The method of claim 6, in which said multiple channel smart device comprises mobile device, smart watch, or smart assistant.

8. The method of claim 1, further comprising the steps of:
adjusting said trigger or alert notification parameters based on a burner knob setting, a vessel or cookware used for cooking or heating operation, a quantity, volume or type of ingredient;
storing data pertaining to new food or recipe being cooked or heated; and
sensing new food or recipe being cooked or heated.

9. A system comprising:
means for configuring an attribute data describing a cooking or heating time and a weight or volume for a predetermined food or recipe;
means for storing said attribute data describing said cooking or heating time and weight or volume for said predetermined food or recipe;
means for configuring a parameter data describing an environment of said cooking or heating for said predetermined food or recipe;
means for storing said parameter data describing said environment of said cooking or heating for said predetermined food or recipe, in which said parameter data includes at least one of a predetermined temperature sensor reading, a temperature gradient, a gas sensor reading, a light sensor reading, a humidity sensor reading, a motion sensor reading, and a weight sensor reading;
means for configuring a sequence of trigger or alert notification, said sequence of trigger or alert notification including at least one of notifying, a normal cooking or heating condition, a pre-hazardous cooking or heating condition, and a non-optimal cooking or heating condition for said predetermined food or recipe;
means for storing said sequence of trigger or alert describing said normal cooking or heating condition, pre-hazardous cooking or heating condition, and non-optimal cooking or heating condition, wherein said condition data further includes an image of at least one of, cooked food, liquid boiling over, and blackened or charred food;
means for sensing an initiation of a cooking or heating operation;
means for sensing at least one of an attribute and parameter involved in said cooking or heating operation;
means for transforming said at least one of said initiation of cooking or heating operation, sensed attribute, and sensed parameter into a computer readable command;
means for mapping or comparing at least one of said initiation of said initiation of cooking or heating operation, sensed attribute, and sensed parameter with said stored attribute data, parameter data, and sequence of trigger or alert to find a match or a lack thereof;
means for executing said trigger or alert when said configured normal cooking or heating condition is reached;
means for overriding said configured sequence of triggers or alerts to immediately execute said trigger or alert if said pre-hazardous cooking or heating condition or configured non-optimal condition is reached;
means for connecting with at least one of, a smart device and a smart assistant for a user interface and a user communication functionality; and
means for communicating or interacting with said at least one of, smart device and smart assistant for storing new data or for alerting and notification purposes.

10. A method comprising:
steps for storing at least one of an attribute data and a parameter data pertaining to a weight or volume of a predetermined food or recipe to be cooked or heated;
steps for training upon sensor data received from a singular or plurality of sensors and from said stored data to determine a duration of cooking or heating operation for said food or recipe;
steps for learning said duration of cooking or heating operation for said food or recipe based from a result of said training step;
steps for predicting said duration of cooking or heating operation for said food or recipe based on a result of said learning step;
steps for gathering shared data about said duration of cooking or heating operation for said food or recipe from a network of users; and
steps for updating said stored data based on said learning step and shared data about said duration of cooking or heating operation for said food or recipe.

11. The Method of claim 10, in which said data is stored in a pre-configured database or library of variety of food and associated cooking or heating sequences and duration for cooking or heating.

12. The Method of claim 11, further comprising the steps for re-configuring said pre-configured database or library of variety of food and associated cooking or heating sequence and duration for cooking or heating based on optimal cooking or heating preferences.

13. The Method of claim 12, further comprising the steps for configuring new food and associated cooking or heating sequence and duration for cooking or heating based on cooking or heating preferences.

14. The Method of claim 13, further comprising the steps for collecting new data for storage in said database or library, wherein, if a sequence or duration is not detected between real time data of cooking or heating operation and said stored data, an image and analyzed attribute of food or recipe being cooked or heated are stored.

15. The Method of claim 14, further comprising the steps for sharing said pre-configured database or library within said network of users.

16. The Method of claim 15, further comprising:
   steps for configuring a trigger or alert notification for said cooking or heating operation, wherein said trigger or alert configuration includes storage and configuration of at least a physical property and image of a kitchen equipment implemented during said cooking or heating operation, and burner knob positions;
   wherein said physical property comprises at least one of, a dimension, a weight, a type, and a volume of said kitchen equipment; and
   wherein said kitchen equipment comprises at least a cookware or a vessel.

17. The Method of claim 16 further comprising the steps for executing a trigger or alert to notify a user of a hazardous condition based on at least one of, a gas leakage, a concentration of vapors beyond a trigger value, a burner switched on without any actual cooking operation, overflowing liquids, and browning or burning of food.

18. The Method of claim 16 further comprising the steps for executing a trigger or alert to notify a user that a pre-configured optimal cooking or heating time duration of a cooking or heating operation for a predetermined food or recipe is completed.

19. The Method of claim 18 further comprising the steps for resetting or amending said trigger or alert notification for said cooking or heating time duration of said cooking or heating operations of said predetermined food or recipe.

20. The Method of claim 18, in which said singular or plurality of sensors include at least one of, a heat sensor, a weight sensor, a temperature sensor, a motion detection sensor, a gas sensor, and an imaging receiver that is configured to determine a current state of said cooking or heating operation.

* * * * *